United States Patent
Kamiya

(10) Patent No.: US 6,546,184 B2
(45) Date of Patent: Apr. 8, 2003

(54) STILL PICTURE PLAYER

(75) Inventor: Akira Kamiya, Hirakata (JP)

(73) Assignee: Matsushita Electric Industrial Co., Ltd, Osaka-fu (JP)

( * ) Notice: Subject to any disclaimer, the term of this patent is extended or adjusted under 35 U.S.C. 154(b) by 0 days.

(21) Appl. No.: 09/143,540

(22) Filed: Aug. 28, 1998

(65) Prior Publication Data

US 2002/0126987 A1 Sep. 12, 2002

(30) Foreign Application Priority Data

Aug. 29, 1997 (JP) ............................................. 9-235087

(51) Int. Cl.⁷ ................................................. H04N 5/91
(52) U.S. Cl. .......................................... 386/46; 386/121
(58) Field of Search .............................. 386/46, 68–70, 386/83, 86, 97, 106, 109, 111–112, 126, 121, 38; 360/22, 48; 348/220, 231–232; 345/202, 537–539; 370/474; 463/4

(56) References Cited

U.S. PATENT DOCUMENTS

| | | | | |
|---|---|---|---|---|
| 5,278,663 A | * | 1/1994 | Hong | 386/38 |
| 5,604,512 A | | 2/1997 | Okamoto et al. | |
| 5,796,743 A | * | 8/1998 | Bunting et al. | 370/474 |
| 5,796,910 A | * | 8/1998 | Nagano et al. | 386/126 |
| 6,005,679 A | * | 12/1999 | Haneda | 345/202 |
| 6,097,558 A | * | 8/2000 | Oguro | 360/22 |
| 6,148,138 A | * | 11/2000 | Sawabe et al. | 386/69 |
| 6,149,520 A | * | 11/2000 | Takatsuka | 463/4 |

FOREIGN PATENT DOCUMENTS

| | | |
|---|---|---|
| EP | 0 639 927 A3 | 2/1995 |
| EP | 0 795 871 A2 | 9/1997 |

* cited by examiner

Primary Examiner—Thai Tran
Assistant Examiner—Christopher Onuaku
(74) Attorney, Agent, or Firm—Wenderoth, Lind & Ponack, L.L.P.

(57) ABSTRACT

A display frame selecting portion selects only frame data to be played. A display data managing portion writes only the received and decoded display data to be played in a storage area of a display data storage portion. The display data managing portion and a display control portion 1606 are connected through a header information storage portion, executing toggle processing to the display data storage portion. The display data managing portion writes the decoded frame data in an enabled storage area IP. The display control portion continues to read display data from a storage area IP with write completed until the end of writing of display data to be played next, and a display portion continues to display the display data. Thus, it is possible to provide a still picture player for expanding a function of a video player and displaying required still picture (for example, still picture selected according to preferences on a viewer's side, and the like) among inputted still pictures without a blackout.

29 Claims, 31 Drawing Sheets

| |
|---|
| 0x24000 |
| 0x27000 |
| ⋮ |

F I G. 5

| stream_id | PTS | DTS | picture_coding_type | temporal_reference | STORAGE AREA |
|---|---|---|---|---|---|
| 0xE0 | 0x18000 | 0x10000 | I | 0 | IP[1] |
| 0xE0 | 0x24000 | 0x16000 | I | 2 | |
| ...... | | | | | |

F I G. 26   PRIOR ART

| stream_id | PTS | DTS | picture_coding_type | temporal_reference | STORAGE AREA |
|---|---|---|---|---|---|
| 0xE0 | 0x15000 | 0x6000 | I | 0 | IP[ ] |
| 0xE0 | 0x24000 | 0x9000 | P | 3 | |

| TIME INFORMATION | NOTIFIER IDENTIFICATION INFORMATION |
|---|---|
| 0x15000 | DISPLAY CONTROL PORTION |
| 0x9000 | DECODE PROCESSING PORTION |
| 0x24000 | DISPLAY CONTROL PORTION |

STILL PICTURE PLAYER

BACKGROUND OF THE INVENTION

1. Field of the Invention

This invention relates to still picture players, and more specifically, to a still picture player for expanding a video playing function of a video player to provide the video player with a still picture playing function.

2. Description of the Background Art

Recently, digital broadcasting services using communications satellites and the like have been receiving attention. In such services, generally, a video player is set up at a receiving end of digital video. FIG. 22 is a block diagram showing the structure of a conventional video player. In FIG. 22, the video player includes a frame data receiving portion 1601, a frame data storage portion 1602, a decode processing portion 1603, a display data managing portion 1604, a display data storage portion 1605, a display control portion 1606, a display portion 1607, a header information storage portion 1608, and a timing control portion 1609. The timing control portion 1609 includes a timer portion 1610 and a time information storage portion 1611.

Sequentially inputted to the above described video player is frame data in a PES (Packetized Elementary Stream) format, which structures video and is compressed/coded based on the MPEG (Motion Picture Experts Group) standard.

Here, FIG. 23 shows a format of the frame data to be inputted to the video player shown in FIG. 22. In FIG. 23, the format of the frame data is based on standards of ISO/IEC13818-1 and -2, generally including PES Header and Elementary Stream. PES Header includes fields of packet_start_code_prefix, stream_id, PES_packet_length, PTS (presentation_time_stamp), and DTS (decoding_time_stamp) (refer to the drawing), and in addition, includes prescribed fields (not shown) based on the above standards. Elementary Stream has a hierarchical structure, including a sequence layer and a picture layer. In addition, Elementary Stream includes layers (not shown) based on the above standards. Added to the head of the sequence layer is Sequence Header (refer to the drawing) having header information based on the above standards, such as sequence_header_code and the like. Added to the head of the picture layer is Picture Header (refer to the drawing) having header information based on the above standards, such as picture_start_code, temporal_reference, and picture_coding_type and the like. Added to the end of the frame data is sequence_end_code.

Further, FIG. 24 shows frame data I0, P3, . . . which structure the video to be sequentially inputted to the video player shown in FIG. 22. In FIG. 24, temporal_reference of the frame data I0 is "0" and its picture_coding_type is "I". Further, temporal_reference of the frame data P3 is "3", and its picture_coding_type is "P". In this way, an alphabet shown on the left side in each frame data shown in FIG. 24 represents picture_coding_type, and a number shown on the right side represents temporal_reference.

Described next is a processing procedure by the video player using operation from time when the frame data P3 (refer to FIG. 24) arrives at the frame data receiving portion 1601 to time when the frame data P3 is displayed on the display portion 1607 as a specific example.

First, when the frame data P3 arrives, as shown in FIG. 31, display data (frame data) I0 has been stored in a storage area IP[1] in the display data storage portion 1605, and flag information "write completed" has been set in its flag information storage area. Storing processing of display data like this will be described later and not mentioned here.

Referring to a flow chart shown in FIG. 25, described next is a processing procedure by the frame data receiving portion 1601, the frame data storage portion 1602 and the header information storage portion 1608, which are a frame data receiving part. The frame data receiving portion 1601 receives frame data (at this point, P3) encoded in the PES format as shown in FIGS. 23 and 24 (FIG. 25; step S1901). Next, the frame data receiving portion 1601 extracts stream_id, PTS, DTS, picture_coding_type and temporal_reference from the header information of the frame data as required header information to output them to the header information storage portion 1608 (step S1902). Here, the header information is information included in the header based on the above standards, such as PES Header, Sequence Header, Picture Header and the like as shown in FIG. 23.

The header information storage portion 1608 holds a first list as shown in FIG. 26. In FIG. 26, the first list has fields of stream_id, PTS, DTS, picture_coding_type, temporal reference and a storage area. The header information storage portion 1608 stores each header information inputted from the frame data receiving portion 1601 in each corresponding field. The header information storage portion 1608 stores information (IP[0], IP[1], B[0], or B[1]) indicating storage areas inputted from the display data managing portion 1604 in the storage area field. At this point, in the first list, as shown in FIG. 26, "0xE0", "0x15000", "0x6000", "I", "0", and "IP[1]" are set in the fields of stream_id, PTS, DTS, picture_coding_type, temporal_reference and the storage area, respectively, for the frame data I0 which has already arrived. Similarly, for the frame data P3 which newly arrived, "0xE0", "0x24000", "0x9000", "P", and "3" are set. The storage area field of the frame data P3 is blank because information indicating a storage area from the display data managing portion 1604 is not yet inputted to the header information storage portion 1608.

After updating the first list in the above described manner, the header information storage portion 1608 notifies the decode processing portion 1603 and the display control portion 1606 of this update (FIG. 25; step S1903). This notification is hereinafter referred to as "a first list update notification".

Next, the frame data receiving portion 1601 outputs the received frame data (at this time, P3) to the frame data storage portion 1602 (step S1904). The frame data storage portion 1602 stores the received frame data in the internal storage area.

The frame data receiving part executes the above described steps S1901 to S1904 every time frame data is inputted.

Described next is a processing procedure by the timing control portion 1609 referring to a flow chart shown in FIG. 27. Described first is a second list held by the time information storage portion 1611 referring to FIG. 28. In FIG. 28, the second list has fields of time information and notifier identification information. These time information and identification information are stored by the timing control portion 1609, and this processing will be described later. In an example shown in FIG. 28, stored in the time information field and the notifier identification information field are "0x15000" and "display control portion"; "0x9000" and "decode processing portion"; and "0x24000" and "display control portion"; respectively.

First, the timing control portion 1609 checks whether the time information is stored in the above described second list (FIG. 27; steps S2101 and S2102), and when the time information is stored, the timing control portion 1609 goes on to step S2103. When the time information is not stored, the timing control portion 1609 repeatedly executes steps S2101 and S2102 until the time information is stored in the second list. Now assume that the present time is just before "0x9000". At this time, as shown in FIG. 28, since at least three pieces of time information exist in the second list, the timing control portion 1609 goes on to step S2103.

Next, the timing control portion 1609 compares the entire time information in the second list and the present time measured by the timer portion 1610 (step S2103) to determine the relationship between them (step S2104). When determining that the present time reaches any time information in the second list or that the present time passes any time information in the second list, the timing control portion 1609 notifies one or more time information notifiers that the present time has reached the information (step S2105). This notification is hereinafter referred to as "time notification". When determining otherwise, the timing control portion 1609 repeatedly executes steps S2101 to S2104 until the present time reaches time to output time notification. Now assume that the present time reaches time "0x9000". In this case, as is evident from FIG. 28, the timing control portion 1609 outputs time notification to the decode processing portion 1603.

Next, the timing control portion 1609 deletes the time information and the notifier identification information referred to for outputting the time notification from the second list (step S2106). At this time, the time information "0x9000"and the identification information "decode processing portion"are deleted.

The timing control portion 1609 repeatedly executes the above described steps S2101 to S2106.

Described next is a processing procedure by the decode processing portion 1603 referring to a flow chart shown in FIG. 29. The decode processing portion 1603 waits for the above described first list update notification from the header information storage portion 1608 outputted in step S1903 of FIG. 25 (FIG. 29; step S2301), and when receiving the notification (step S2302), the decode processing portion 1603 accesses the header information storage portion 1608 (refer to FIG. 26) to read DTS of the frame data which newly arrived and frame specifying information (in this description, picture_coding_type and temporal_reference) for specifying the frame data from the first list and then holds them. At this point, for the frame data P3, DTS "0x9000", picture_coding_type "P"and temporal_ reference "3"are read out.

The decode processing portion 1603 next notifies the timing control portion 1609 of the held DTS and the identification information "decode processing portion" previously provided for specifying itself (step S2303). Based on the notification, the timing control portion 1609 adds new information to the above second list (this processing is not shown in FIG. 27). At this point, as shown in the middle column in FIG. 28, the time information "0x9000"and the notifier identification information "decode processing portion"are added to the second list.

The decode processing portion 1603 next waits for time notification outputted by the timing control portion 1609 in step S2105 of FIG. 27 (step S2304), and when receiving the notification (step S2305), the decode processing portion 1603 accesses the frame data storage portion 1602 to read the frame data specified by the held frame specifying information and then decode the frame data (step S2306). The decode processing portion 1603 then outputs the decoded frame data and the held frame specifying information to the display data managing portion 1604 (step S2307). At this point, when the present time reaches DTS "0x9000", the frame data P3 specified by picture_coding_type "P"and temporal_reference "3"is read, decoded and then outputted to the display data managing portion 1604.

The decode processing portion 1603 repeatedly executes the above steps S2301 to S2307.

Described next is a processing procedure by the display data managing portion 1604 and the display data storage portion 1605, which are a display data storing processing part. First, the more detailed structure of the display data storage portion 1605 is described referring to FIG. 31. In FIG. 31, the storage area of the display data storage portion 1605 is divided into four storage areas IP[0], IP[1], B[0] and B[1] each having a flag information storage area for storing flag information and a display data storage area for storing the above display data. The flag information has two types indicating whether or not it is possible to store the display data in the corresponding display data storage area. In this description, flag information "enabled"represents that new display data may be written in the corresponding display data storage area. On the other hand, flag information "write completed"represents that the display data now stored in the corresponding display data storage area is still required and new display data must not be written in the display data storage area.

Stored in the display data storage areas in the storage areas IP[0] and IP[1] is a frame compressed/coded by in-frame prediction (I picture; frame data whose picture_ coding_type is "I") or a frame compressed/coded by inter-frame prediction with a preceding frame (P picture; frame data whose picture_coding_type is "P"). Stored in the display data storage areas in the storage areas B[0] and B[1] is a frame compressed/coded by interframe prediction using a past frame and a future frame (B picture; frame data whose picture_coding_type is "B").

Described next is a processing procedure by the display data storing processing part. First, at the time of initialization and the like, the storage area of the display data storage portion 1605 is divided into the storage areas IP[0], IP[1], B[0], and B[1] (FIG. 30; step S2401). At the time of initialization, four pieces of flag information are set to "enabled". However, at this point, that is, when the above frame data P3 is inputted, as shown in FIG. 31, the frame data I0 has already been stored in the display data storage area of the storage area IP[1] and its flag information is set to "write completed".

When the frame data and the frame specifying information after decoding outputted from the decode processing portion 1603 are inputted as display data and display data specifying information (step S2402), the display data managing portion 1604 holds the display data and the display data specifying information. At this point, the display data P3 is inputted, the pictureicoding_type "P"and temporal_ reference "3"are inputted as the display data specifying information.

The display data managing portion 1604 accesses the display data storage portion 1605 to read the currently set flag information from each storage area and then hold the flag information (step S2403). At this point, as is evident from FIG. 31, the flag information of the storage areas IP[0], B[0] and B[1] is "enabled", and the flag information of the storage area IP[1] is "write completed".

The display data managing portion 1604 next determines whether or not the picture type of the held display data is "B" referring to the held display data specifying information (picture_coding_type) (step S2404). At this point, since holding picture_coding_type "P", the display data managing portion 1604 goes on to step S2405.

The display data managing portion 1604 next selects one of the storage areas IP where the flag information "enabled" is set and then writes the held display data in the display data storage area of the selected storage area IP (step S2405). At this point, as is evident from FIG. 31, the display data P3 is written in the storage area IP[0].

The display data managing portion 1604 next changes the flag information of the storage area IP (at this point, [0]) in which the display data is written this time to "write completed" and changes the flag information of the storage area IP (at this point, [1]) which has been set as "write completed" before writing this time to "enabled" (step S2406).

The display data managing portion 1604 next outputs data indicating the storage area in which the display data specifying information and the display data are written this time to request the header information storage portion 1608 to add the information indicating the storage area to the aforesaid storage area field in the first list shown in FIG. 26 (step S2407). In response to the request, based on the inputted display data specifying information, the header information storage portion 1608 adds the simultaneously inputted information indicating the storage area to the aforesaid storage area field. At this point, as is evident from the above description, IP [0] is added to the blank storage area field in the first list shown in FIG. 26.

When holding picture_coding_type [I], the display data managing portion 1604 executes the above steps S2405, S2406 and S2407 as in the same manner. When holding picture_coding_type [B], the display data managing portion 1604 executes the above steps S2408, S2409 and S2407. Compared to steps S2405 and S2406, steps S2408 and S2409 are different, as is evident from FIG. 30, only in that the storage area is a B type, and thus their description is omitted.

The display data storing processing part repeats two types of processing procedure (steps S2401 to S2407 or steps S2401 to S2404→S2408→S2409→S2407) according to the above picture types.

Described next is a processing procedure by the display control portion 1606 and the display portion 1607, which are a video display part, referring to a flow chart shown in FIG. 32. First, the display control portion 1606 waits for first list update notification from the above described header information storage portion 1608 (FIG. 32; step S2601), and when receiving the notification (step S2602), the display control portion 1606 accesses the header information storage portion 1608 (refer to FIG. 26) to read PTS of frame data which newly arrived from the first list and then holds PTS. At this point, PTS "0x24000" of the frame data P3 is read out. The display control portion 1606 next notifies the timing control portion 1609 of the held PTS and the identification information_"display control portion" previously provided for specifying itself (step S2603). The timing control portion 1609 adds, as is the same above, new information to the second list based on the notification. At this point, as shown in a lower column in FIG. 28, the time information "0x24000" and the notifier identification information "display control portion" are newly added.

The display control portion 1606 next waits for the above described time notification from the timing control portion 1609 (step S2604), and when receiving the notification (step S2605), the display control portion 1606 accesses the header information storage portion 1608 to recognize the storage area of the display data storage portion 1605 in which the display data to be displayed this time is stored to perform a search referring to the held PTS (step S2606). Next, the display control portion 1606 accesses the storage area obtained at step S2606 to read the display data from the storage area and then output the display data to the display portion 1607 (step S2607), and the display portion 1607 displays the inputted display data (step S2608).

At this point, in the first list shown in FIG. 26, IP[0] is set in the storage area field corresponding to PTS "0x24000" (refer to the above description). The display data P3 is read based on PTS "0x24000" therein from the storage area IP[0] and then displayed.

The display control portion 1606 then outputs the held PTS to request the header information storage portion 1608 to delete the header information corresponding to the display data displayed this time from the first list (step S2609). The header information storage portion 1608 deletes the header information of the aforesaid display data based on PTS which is simultaneously inputted with this request. This processing by the header information storage portion 1608 is not shown in the flow chart of FIG. 25. At this point, as to the display data P3, "0xE0, 0x24000", "0x9000 ", "P", "3" and IP[0] are deleted.

The video displaying part repeatedly executes the above steps S2601 to S2609.

In this way, the present video player sequentially plays the inputted frame data of the video. Adjustment between the present time and arrival time of frame data by the timer portion 1610 is not mentioned above because it is not a main point of the present invention. Further, the video player may be structured as such that step S2609 of FIG. 32 which is the processing procedure by the video displaying part is not executed and that the header information storage portion 1608 holds information about the entire frame data.

By the way, in digital broadcasting service, video and still picture are provided. The conventional video player shown in FIG. 22 is mainly structured so as to sequentially play video without interruption. That is, the display data managing portion 1604 and the display control portion 1606 are connected through the header information storage portion 1608 to execute toggle processing to the display data storage portion 1605. More specifically, the display data managing portion 1604 writes decoded frame data in a storage area which is enabled and conforms to a picture type of the frame data. During this writing, the display control portion 1606 reads the display data from the storage area in which write is completed, according to PTS.

Described next are problems in the conventional video player. There is a significant difference when video is compared with still picture. That is, the frame data of the video is required to be sequentially played in predetermined order. On the other hand, the still picture is required to be selectively displayed according to preferences of a viewer's side. In other words, the still picture is not necessarily displayed in predetermined order. In this point, the video is significantly different from the still picture.

However, since the conventional video player executes the above described toggle processing, display data is overwritten in any of the storage areas in the display data storage portion 1605 at regular time intervals. Therefore, when the conventional video player plays a still picture, display data required for the viewer's side is overwritten by following unwanted display data, disadvantageously not allowing continuous display of the display data required for the viewer's side. For example, assume that ten still pictures are sequentially inputted. The first to tenth still pictures are formed of a first to tenth frame data, respectively. When playing the first frame data and then the tenth frame data, the conventional video player has to make a blackout of the frame data inputted therebetween. Since this blackout is not preferable in view of information quality, it is important to continuously display the display data required for the viewer's side (for example, the still picture selected according to preferences of the viewer's side, and the like).

SUMMARY OF THE INVENTION

Therefore, an object of the present invention is to provide a still picture player of expanding functions of a video player and displaying required still picture (for example, still picture selected according to preferences of the viewer's side, and the like) among inputted still pictures without a blackout.

The present invention has the features described in the following first to twenty-seventh aspects to achieve the object above.

A first aspect is directed to a still picture player for expanding a video playing function of a video player to provide a still picture playing function for the video player, comprising:
  a condition storage portion for storing a condition for specifying still picture of a frame to be played;
  a frame selecting portion for determining whether the inputted still picture matches the condition stored in the condition storage portion and selecting only still picture which matches the condition;
  a decode processing portion for decoding the still picture selected by the frame selecting portion;
  a display data storage portion having a plurality of areas for storing a plurality of pieces of display data which is the still picture decoded by the decode processing portion;
  a toggle processing portion for executing toggle processing to write the display data in an enabled area among the plurality of areas and continue to read the display data to be played from other areas except the enabled area; and
  a display portion for displaying the display data read by the toggle processing portion.

In the above first aspect, the toggle processing portion writes the display data in an enabled area among the plurality of areas and reads the display data from other areas except the enabled area. However, stored in each area of the display data storage portion is only the display data to be played, and the toggle processing portion continues to access the storage area in which the display data has been already written until the end of writing of the display data to be played next. Therefore, even when the above toggle processing is executed, display switching of the still picture is smoothly made without a blackout. Thus, the still picture player can continue to display required still picture, which matches the condition among the inputted still pictures, without a blackout.

According to a second aspect, in the first aspect, the still picture includes header information according to a prescribed encoding method; and
  the condition for specifying the still picture is based on the header information.

According to a third aspect, in the first aspect, the still picture includes a hierarchical structure having unique header information in each layer; and
  the condition for specifying the still picture is based on the header information.

In the second or third aspect, the condition information is based on the format of the still picture, and thereby it is not required to add the condition information to the still picture.

A fourth aspect is directed to a still picture playing device for expanding a video playing function of a video player to provide a still picture playing function for the video player, comprising:
  a condition storage portion for storing a condition for specifying still picture of a frame to be played;
  a decode processing portion for determining whether the inputted still picture matches the condition stored in the condition storage portion and decoding only still picture which matches the condition;
  a display data storage portion having a plurality of areas for storing a plurality of pieces of display data which is the still picture decoded by the decode processing portion;
  a toggle processing portion for executing toggle processing to write the display data in an enabled area among the plurality of areas and continue to read the display data from other areas except the enabled area; and
  a display portion for displaying the display data read by the toggle processing portion.

In the above fourth aspect, as in the first aspect, stored in each area of the display data storage portion is only the display data to be played, and the toggle processing portion continues to access the storage area in which display data has been already written until the end of writing of the display data to be played next. Therefore, even when the above toggle processing is executed, display switching of the still picture is smoothly made without a blackout. Thus, the still picture player can continue to display only still picture which matches the set condition among the inputted still pictures as the required still picture without a blackout.

According to a fifth aspect, in the fourth aspect, the still picture includes header information according to a prescribed encoding method; and
  the condition for specifying the still picture is based on the header information.

According to a sixth aspect, in the fourth aspect, the still picture includes a hierarchical structure having unique header information in each layer; and
  the condition for specifying the still picture is based on the header information.

In the fifth or sixth aspect, the condition information is based on the format of the still picture, and thereby it is not required to add the condition information to the still picture.

A seventh aspect is directed to a still picture playing device for expanding a video playing function of a video player to provide a still picture playing function for the video player, comprising:
  a condition storage portion for storing a condition for specifying still picture of a frame to be played;
  a decode processing portion for decoding the inputted still picture;
  a display data storage portion including two areas for storing two pieces of display data which is the still picture decoded by the decode processing portion;
  a toggle processing portion for assigning one of the two areas as a first area for writing the display data and the other of the two areas as a second area for reading display data which has been already written therein, changing assignment of the first and second areas to the two areas when the display data written in the first area matches the condition stored in the condition storage portion and continuing to read from the second area when otherwise; and a display portion for displaying the display data read by the toggle processing portion.

In the above seventh aspect, the toggle processing portion changes assignment of the first and second areas to the two areas when the display data written in the first area matches the condition stored in the condition storage portion, and continues to read from the second area when otherwise. Therefore, the toggle processing continues to assign the area in which the display data has been already written as the second area until the end of writing of the display data to be played next, and thus it is possible to continue to read the display data to be displayed from the second area. Therefore, even when the above toggle processing is executed, display switching of the still picture is smoothly made without a blackout. Thus, the still picture player can continue to display only still picture which matches the set condition among the inputted still pictures as the required still picture without a blackout.

According to an eighth aspect, in the seventh aspect, the two areas further each have a flag information storage area for storing first or second flag information indicating assignment as a first or second area; and the toggle processing portion executes assignment of the first and second areas and a change in assignment of the first and second areas using the first and second flag information.

According to a ninth aspect, in the seventh aspect, the toggle processing portion further includes an area managing information storage portion for managing first or second area managing information indicating that the two areas are assigned as the first or second area; and the toggle processing portion executes assignment of the first and second areas and a change in assignment of the first and second areas referring to the area managing information storage portion.

In accordance with the eighth or ninth aspect, the toggle processing portion can manage the information for indicating the first and second areas assigned by itself, thereby allowing accurate writing and reading of the display data.

According to tenth to twelfth aspects, in the seventh to ninth aspects, respectively, the still picture includes header information according to a prescribed encoding method; and the condition for specifying the still picture is based on the header information.

According to thirteenth to fifteenth aspects, in the seventh to ninth aspects, respectively, the still picture includes a hierarchical structure having unique header information in each layer; and the condition for specifying the still picture is based on the header information.

In the tenth to twelfth aspects or the thirteenth to fifteenth aspects, the condition information is based on the format of the still picture, and thereby it is not required to add the condition information to the still picture.

A sixteenth aspect is directed to a still picture playing device for expanding a video playing function of a video player to provide a still picture playing function for the video player, comprising:

a condition storage portion for storing a condition for specifying still picture of a frame to be played;

a decode processing portion for decoding the inputted still picture;

a display data storage portion having two areas for storing two pieces of display data which is the still picture decoded by the decode processing portion;

a toggle processing portion for assigning one of the two areas as a first area for writing the display data and the other of the two areas as a second area for reading display data which has been already written therein, changing assignment of the first and second areas to the two areas after reading from the first area when the display data written in the first area matches the condition stored in the condition storage portion and waiting for writing of new display data in the first area when otherwise;

a display memory portion for storing the display data read by the toggle processing portion; and a display portion for reading the display data from the display memory portion and displaying the display data.

In the above sixteenth aspect, the toggle processing portion writes the display data in an enabled area among the plurality of areas and selects only the display data to be played from the other area except the enabled area based on the condition in the condition storage portion to read the display data. The read display data is stored in the display memory portion, and the display portion reads the display data therefrom and displays the display data. Therefore, the display portion can display the played display data regardless of the processing by the toggle processing portion. Therefore, even when the above toggle processing is executed, display switching of the still picture is smoothly made without a blackout. Thus, the still picture player can continue to display a still picture which matches the set condition among the inputted still pictures as the required still picture without a blackout.

According to a seventeenth aspect, in the sixteenth aspect, the still picture includes header information according to a prescribed encoding method; and the condition for specifying the still picture is based on the header information.

According to an eighteenth aspect, in the sixteenth aspect, the still picture includes a hierarchical structure having unique header information in each layer; and the condition for specifying the still picture is based on the header information.

In the seventeenth or eighteenth aspect, the condition information is based on the format of the still picture, and thereby it is not required to add the condition information to the still picture.

A nineteenth aspect is directed to a still picture playing device for expanding a video playing function of a video player to provide a still picture playing function for the video player, comprising:

a condition storage portion for storing a condition for specifying still picture of a frame to be played;

a decode processing portion for decoding the inputted still picture;

a display data storage portion including areas whose number is at the maximum the number of pieces of the still picture which can be stored by the areas and storing display data which is the still picture decoded by the decode processing portion in the areas;

a toggle processing portion for assigning any area among the areas as a first area for writing the display data and any area except the first area as a second area for reading display data which has been already written therein, changing assignment of the first and second areas to the areas included in the display data storage portion when the display data written in the first area matches the condition stored in the condition storage portion and continuing to read from the second area when otherwise; and a display portion for displaying the display data read by the toggle processing portion.

In the above nineteenth aspect, the toggle processing portion changes assignment of the first and second areas to the areas included in the display data storage portion when the display data written in the first area matches the condition stored in the condition storage portion, and continues to read from the second area when otherwise. Therefore, the toggle processing continues to assign the area in which the display data has been already written as the second area until the end of writing of the display data to be played next, and thus it is possible to continue to read the display data to be displayed from the second area. Therefore, even when the above toggle processing is executed, display switching of the still picture is smoothly made without a blackout. Thus, the still picture player can continue to display a still picture which matches the set condition among the inputted still pictures as the required still picture without a blackout.

According to a twentieth aspect, in the nineteenth aspect, the areas further each have a flag information storage area for storing first or second flag information indicating assignment as a first or second area; and the toggle processing portion executes assignment of the first and second areas and a change in assignment of the first and second areas using the first and second flag information.

According to twenty-fifth to twenty-seventh aspects, in the nineteenth to twenty-first aspects, respectively, the still picture includes a hierarchical structure having unique header information in each layer; and the toggle processing portion executes assignment of the first and second areas and a change in assignment of the first and second areas referring to the area managing information storage portion.

In accordance with the twentieth or twenty-first aspect, the toggle processing portion can manage the information for indicating the first and second areas assigned by itself, thereby allowing accurate writing and reading of the display data.

According to twenty-second to twenty-fourth aspects, in the nineteenth to twenty-first aspects, respectively, the still picture includes header information according to a prescribed encoding method; and the condition for specifying the still picture is based on the header information.

According to a twenty-fifth to twenty-seventh aspects, in the nineteenth to twenty-first aspects, respectively, the still picture includes a hierarchical structure having unique header information in each layer; and the condition for specifying the still picture is based on the header information.

In the twenty-second to twenty-fourth aspects or the twenty-fifth to twenty-seventh aspects, the condition information is based on the format of the still picture, and thereby it is not required to add the condition information to the still picture.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing a storage area of a display frame condition storage portion 112 when PTS is used as condition information set by a display frame condition setting portion 111 shown in FIG. 2;

FIG. 5 is a diagram showing a first list held by a header information storage portion 1608 shown in FIG. 2;

FIG. 26 is a diagram showing a first list held by the header information storage portion 1608 shown in FIG. 22 therein;

FIG. 28 is a diagram showing a second list held by a time information storage portion 1611 shown in FIG. 22 therein;

DESCRIPTION OF THE PREFERRED EMBODIMENTS

Figure 24:
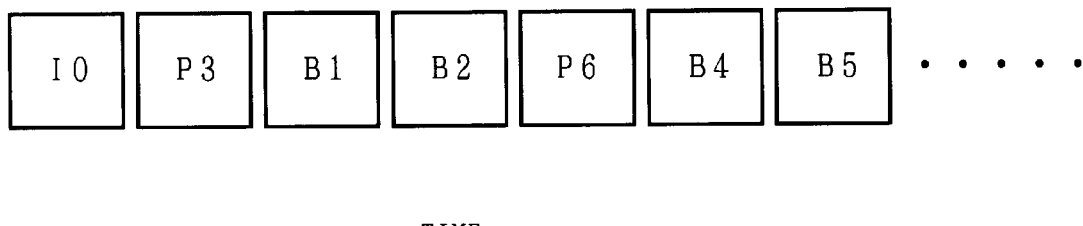
FIG. 24 shows frame data I0, P3, ... structuring the video to be sequentially inputted to the video player shown in FIG. 22.

Described below is a still picture player according to preferred embodiments of the present invention. Prior to that, still pictures, each of which is formed of frame data I0, I1, I2, I3, ... , respectively, will be described referring to FIG. 1. In the present preferred embodiments, assume that the format of each frame data is based on standards of ISO/IEC13818-1 and -2, that is, standards of Part 1 and Part 2 of MPEG2. The detail of the format has already been described in Background Art section, and thus its detailed description is omitted herein. Further, as in FIG. 24, an alphabet shown on the left side in the shown frame data represents picture_coding_type, and a number shown on the right side represents temporal_reference. Further, numbers just below the shown frame data represent its DTS and PTS. Therefore, for example, the frame data I0 includes temporal_reference "0", picture_coding_type "I", DTS "0x10000" and PTS "0x18000".

Furthermore, in a typical still picture, the frame data I0 which structures the information is a menu, being structured so that a viewer's side can select the still picture which the viewer wants to display next (for example, the frame data I2) on the menu. This allows the viewer to selectively watch the still picture according to preferences as required still picture. Further, the still picture is preferably cyclically transmitted so that the viewer can recapture each frame data if once missing it. Described above is the typical still picture, and by executing operation described below, the present still picture player can play the required still picture without a blackout in whichever format the still picture is inputted. Described below is each embodiment of the present invention.

Figure 2:
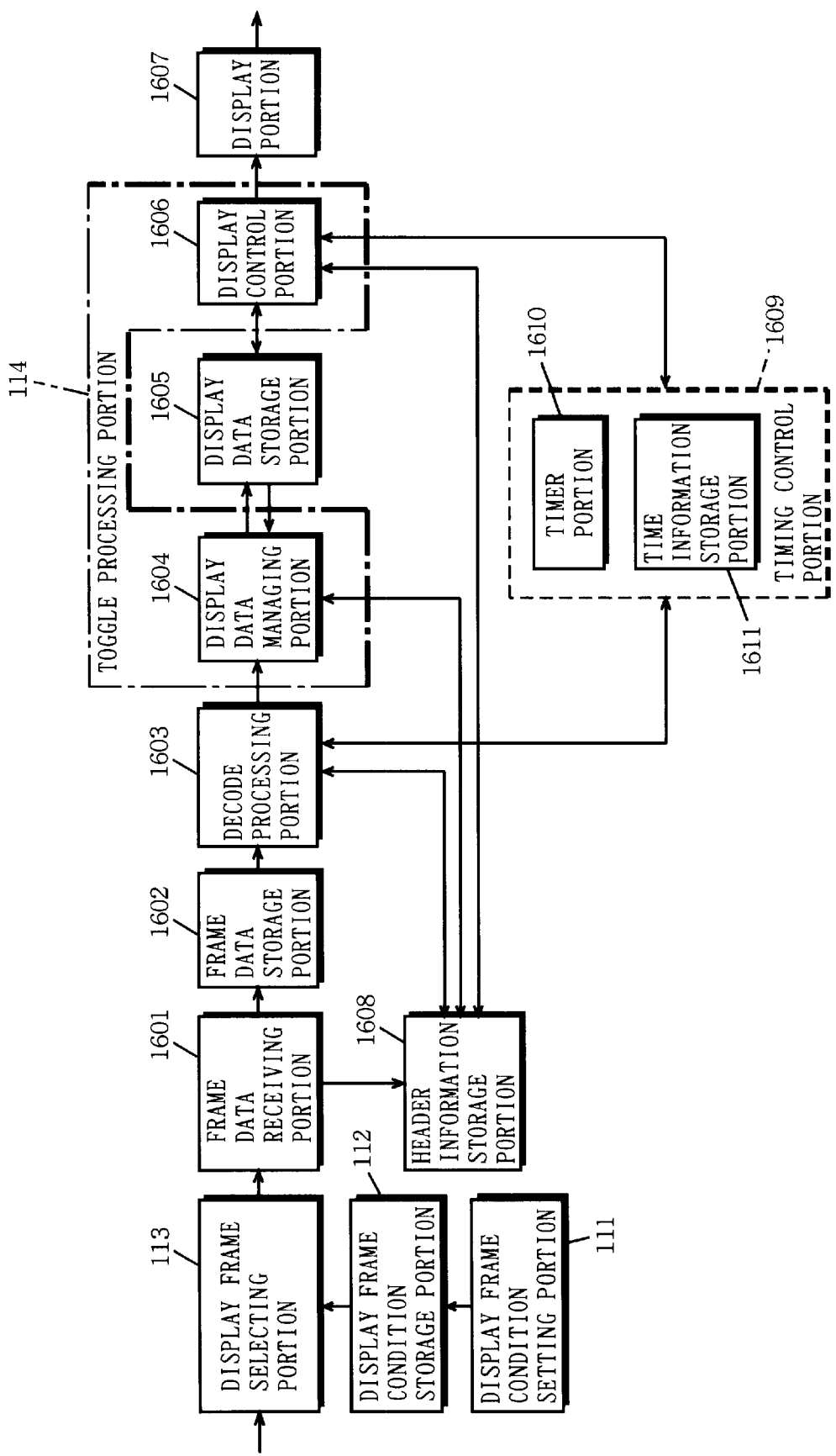
FIG. 2 is a block diagram showing the structure of a still picture player according to a first embodiment of the present invention.
Figure 22:
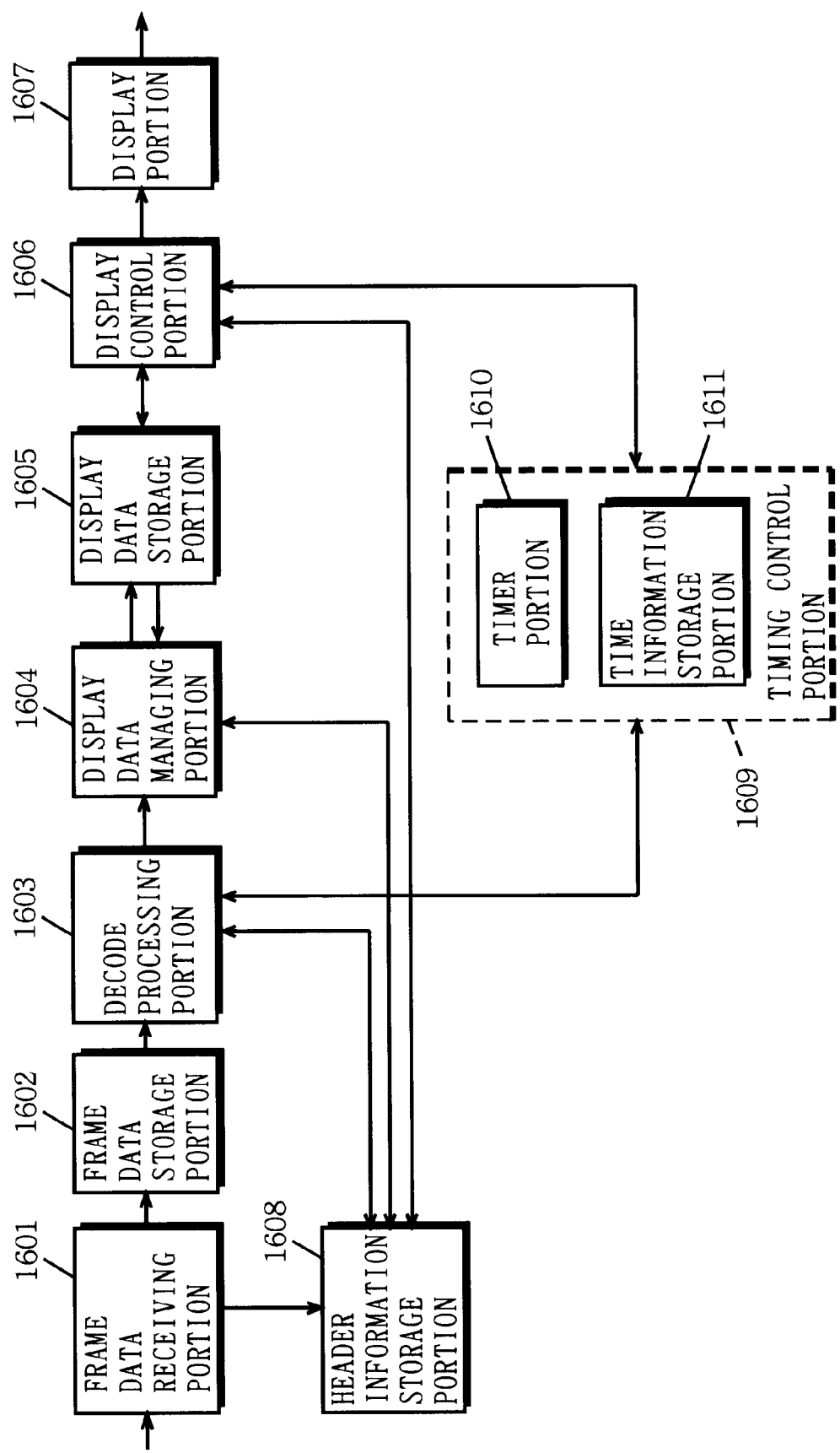
FIG. 22 is a block diagram showing the structure of a conventional video player.

FIG. 2 is a block diagram showing the structure of a still picture player according to a first embodiment of the present invention. The still picture player of FIG. 2 is different compared to the video player of FIG. 22 in that a display frame condition setting portion 111, a display frame condition storage portion 112 and a display frame selecting portion 113 are further included and that the display data managing portion 1604 and the display control portion 1606 form a toggle processing portion 114 (refer to the part surrounded by a chain line). Other than that, the still picture player of FIG. 2 is the same as that of FIG. 22, and thus in FIG. 2, the same reference numerals are provided for the structures corresponding to those of FIG. 22 and their description is simplified. Described below is an operation of the still picture player shown in FIG. 2.

Inputted to the present still picture player are the frame data I0, I1, ... described above referring to FIG. 1. For clear description, assume that the present still picture player displays the frame data I0 as a menu and that the viewer's side selects and specifies next still picture to be displayed (for example, the frame data I2). In this case, the present still picture player plays the frame data I0 and then skips the frame data I1 to play the frame data I2 without a blackout.

First, the frame condition setting portion 111 sets a condition for specifying frame data to be played by the present still picture player, and more specifically, in response to the above described specification by the viewer, generates data about the condition for specifying frame data to be played (for example, I2) (hereinafter referred to as "condition information") to output the condition information to the following display frame condition storage portion 112. The display frame condition storage portion 112 stores the inputted condition information in its internal storage area. In the following description, PTS is used as the condition information. In this case, stored in the storage area of the display frame condition storage portion 112 is, as shown in FIG. 3, PTS "0x24000"of the frame data I2 (and PTS "0x27000" of the frame data I3).

Then, when the frame data of the still picture is inputted, the display frame selecting portion 113 copies and holds only PTS in the inputted frame data, and then accesses the display frame condition storage portion 112 to read and hold all PTSes as the condition information from its storage area. After that, the display frame selecting portion 113 determines whether or not PTS of the inputted frame data exists in PTS as the condition information. The inputted frame data which is determined to match the condition is outputted to the following frame data receiving portion 1601 for reproduction, processed as described in Background Art section, and eventually displayed by the display portion 1607. On the other hand, the frame data which is determined not to match the condition is not outputted to the following frame data receiving portion 1601 and abandoned as it is.

Figure 1:
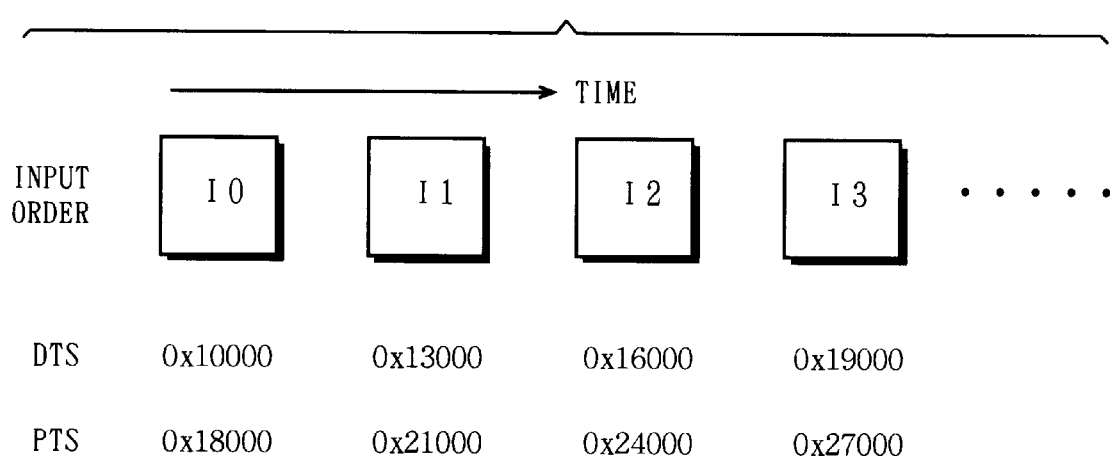
FIG. 1 shows an example of frame data structuring still picture to be inputted to a still picture player according to preferred embodiments of the present invention.
Figure 3:
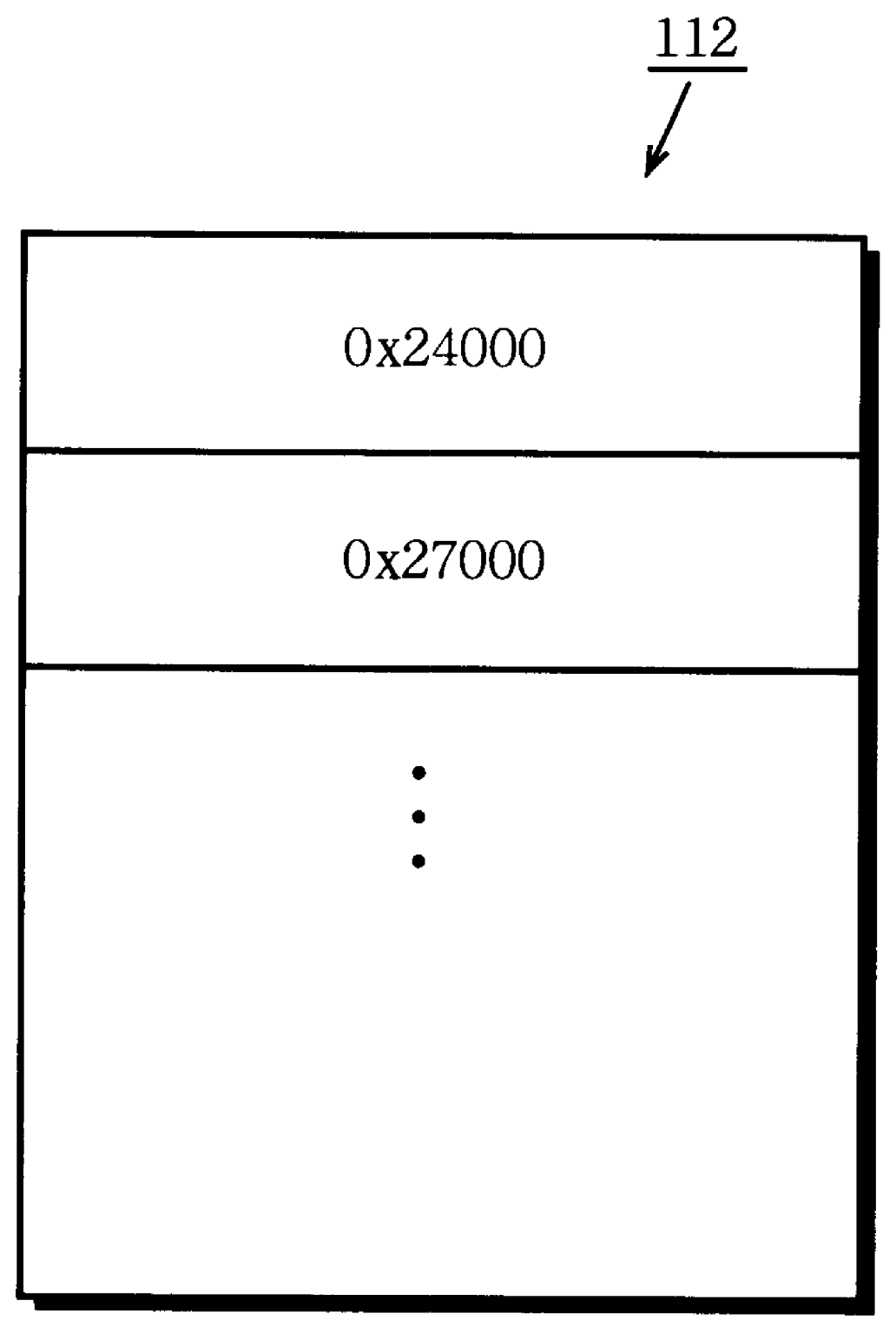

Now assume that the display frame condition storage portion 112 holds PTSes shown in FIG. 3 and that the frame data I1, I2, ... shown in FIG. 1 are sequentially inputted in the display frame selecting portion 113. In this case, PTS of the frame data I1 is "0x21000", and since PTS "0x210001" is not stored in the display frame condition storage portion 112, the display frame selecting portion 113 abandons the frame data I1. However, when the frame data I2 is inputted, its PTS is "0x24000", and thus the display frame selecting portion 113 outputs the frame data I2 to the frame data receiving portion 1601. In this way, the frame data I2 is eventually displayed by the display portion 1607.

At this time, the display data managing portion 1604 and the display control portion 1606 which form the toggle processing portion 114 are connected through the header information storage portion 1608, and execute toggle processing to the display data storage portion 1605. The display data managing portion 1604 writes the decoded frame data in an enabled storage area IP (for example, IP[0]). During this writing, the display control portion 1606 reads display data from a storage area with write completed (for example, IP[1]) according to PTS. This is the same as in the conventional video player. However, the frame data receiving portion 1601 writes only the frame data to be played in the frame data storage portion 1602 and the display data managing portion 1604 writes only the display data to be played in a storage area in the display data storage portion 1605. Thus, the display control portion 1606 continues to access at regular time intervals another storage area in which display data has already been written until the present time reaches PTS of the display data to be played next, and the display portion 1607 displays the display data read by this access. According to the above specific example, the frame data I0 is continued to be read from the storage area IP[1] until the present time reaches PTS of the frame data I2 written in the storage area IP[0]. Therefore, even when the above toggle processing is executed, display switching of the still picture is smoothly made without a blackout. Thus, the still picture player according to the first embodiment continues to selectively display only the still picture that matches the set condition, that is, the required still picture (for example, still picture specified by the viewer), from among the inputted still pictures without a blackout.

Figure 4:
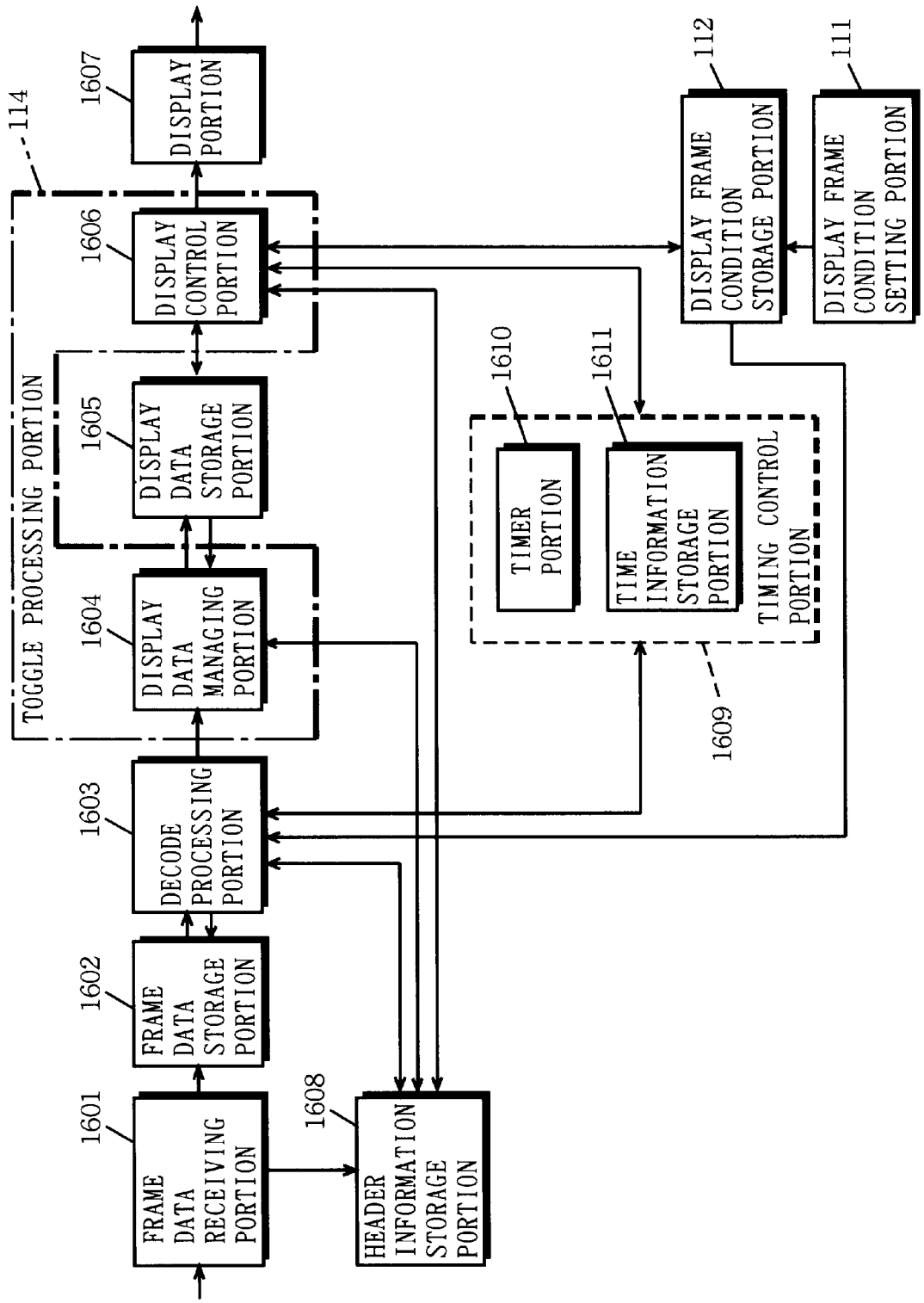
FIG. 4 is a block diagram showing the structure of a still picture player according to a second embodiment of the present invention.

FIG. 4 is a block diagram showing the structure of a still picture player according to a second embodiment of the present invention. The still picture player of FIG. 4 is different compared to the video player of FIG. 22 in that a display frame condition setting portion 111 and a display frame condition storage portion 112 are further included and that the display data managing portion 1604 and the display control portion 1606 form a toggle processing portion 114 (refer to the part surrounded by a chain line). Other than that, the still picture player of FIG. 4 is the same as that of FIG. 22, and thus in FIG. 4, the same reference numerals are provided for the structures corresponding to those of FIG. 22 and their description is omitted. However, processing executed by the decode processing portion 1603 and the display control portion 1606 is different from that executed by the corresponding structure in FIG. 22. Therefore, described below is an operation of the still picture player shown in FIG. 4, particular differences from the video player shown in FIG. 22.

Also sequentially inputted to the present still picture player are the frame data I0, I1, ... shown in FIG. 1. For clear description, also in the present embodiment, assume that the present still picture player displays a menu based on the frame data I0 at present.

Since the display frame condition setting portion 111 and the display frame condition storage portion 112 execute the same processing procedure as that executed by the corresponding structure in FIG. 2, its description is simplified. That is, the display frame condition setting portion 111 outputs, in response to specification by the viewer's side, PTS as the condition information to the display frame condition storage portion 112, and the inputted PTS as the condition information is stored in the storage area of the display frame condition storage portion 112, as shown in FIG. 3.

Figure 25:
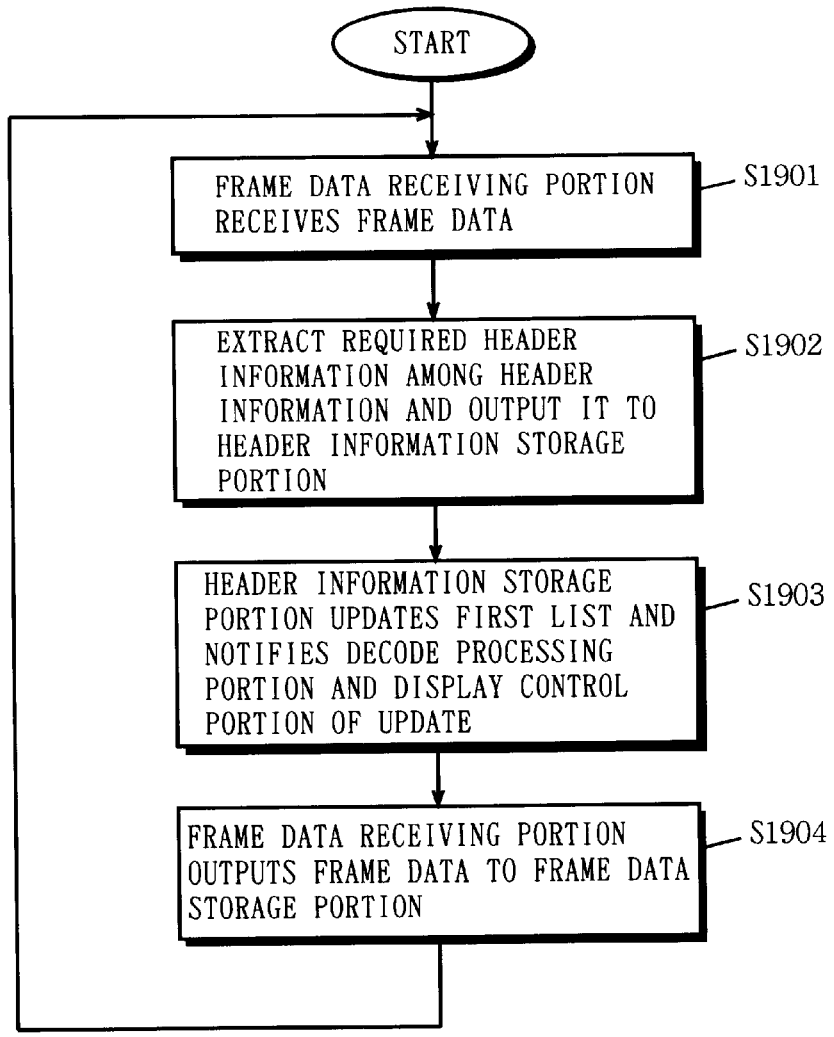
FIG. 25 is a flow chart showing a processing procedure by a frame data receiving part that consists of a frame data receiving portion 1601, a frame data storage portion 1602 and a header information storage portion 1608 shown in FIG. 22.

After that, when the frame data receiving portion 1601 receives the frame data, the frame data receiving part, which consists of the frame data receiving portion 1601, the frame data storage portion 1602 and the header information storage portion 1608 executes the processing procedure shown in the flow chart of FIG. 25. Thus, its detailed description is omitted. Here, the first list of the header information storage portion 1608, has the same fields as shown in FIG. 26, and since only I pictures are inputted in the present still picture player, the first list becomes as such shown in FIG. 5.

Figure 27:
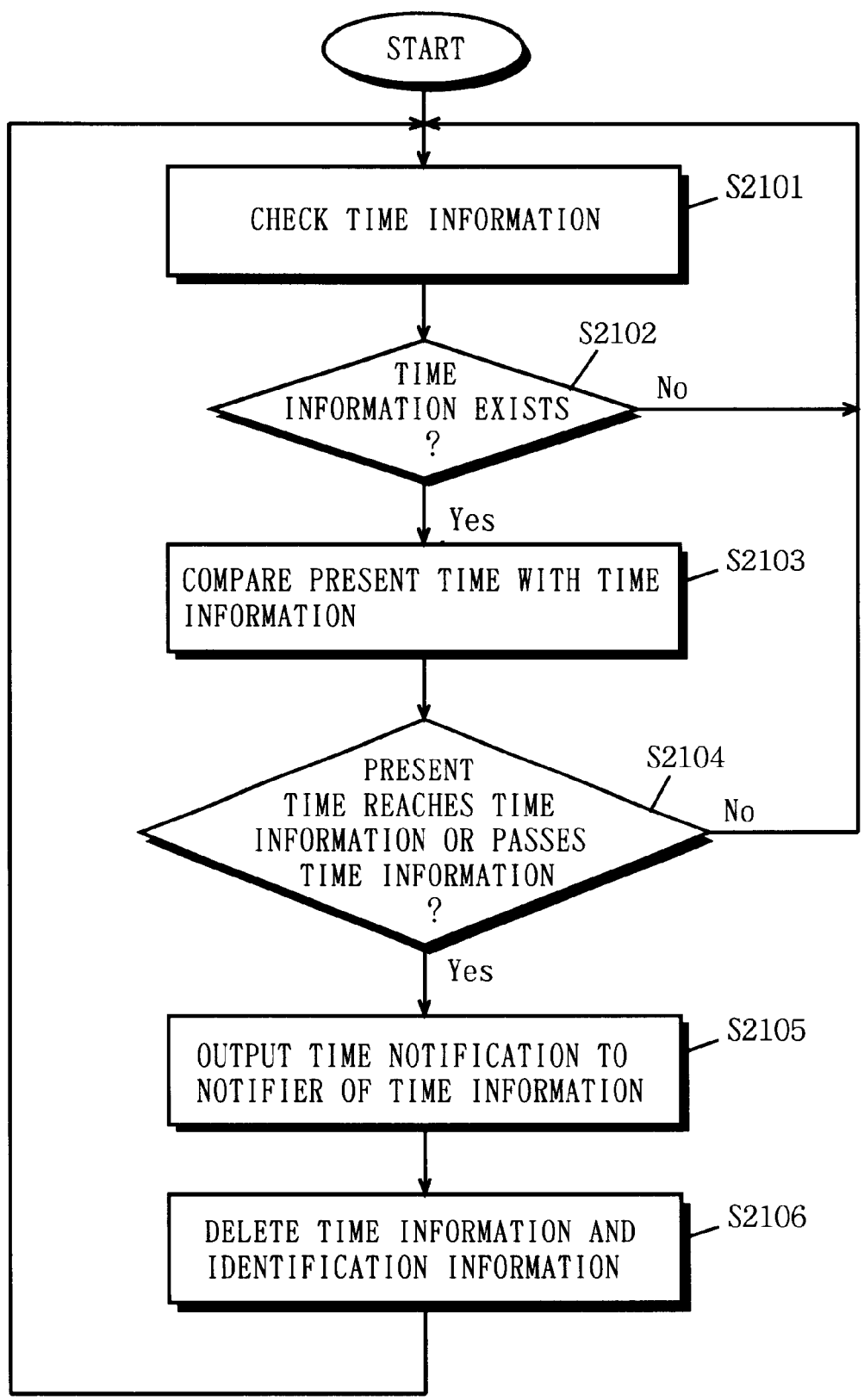
FIG. 27 is a flow chart showing a processing procedure by a timing control portion 1609 shown in FIG. 22.

Further, the timing control portion 1609 executes the processing procedure shown in the flow chart of FIG. 27 and therefore its detailed description is omitted. When the present time reaches DTS or PTS included in the frame data which arrived, in step 2105, the timing control portion 1609 outputs time notification to the decode processing portion 1603 or the display control portion 1606.

Figure 6:
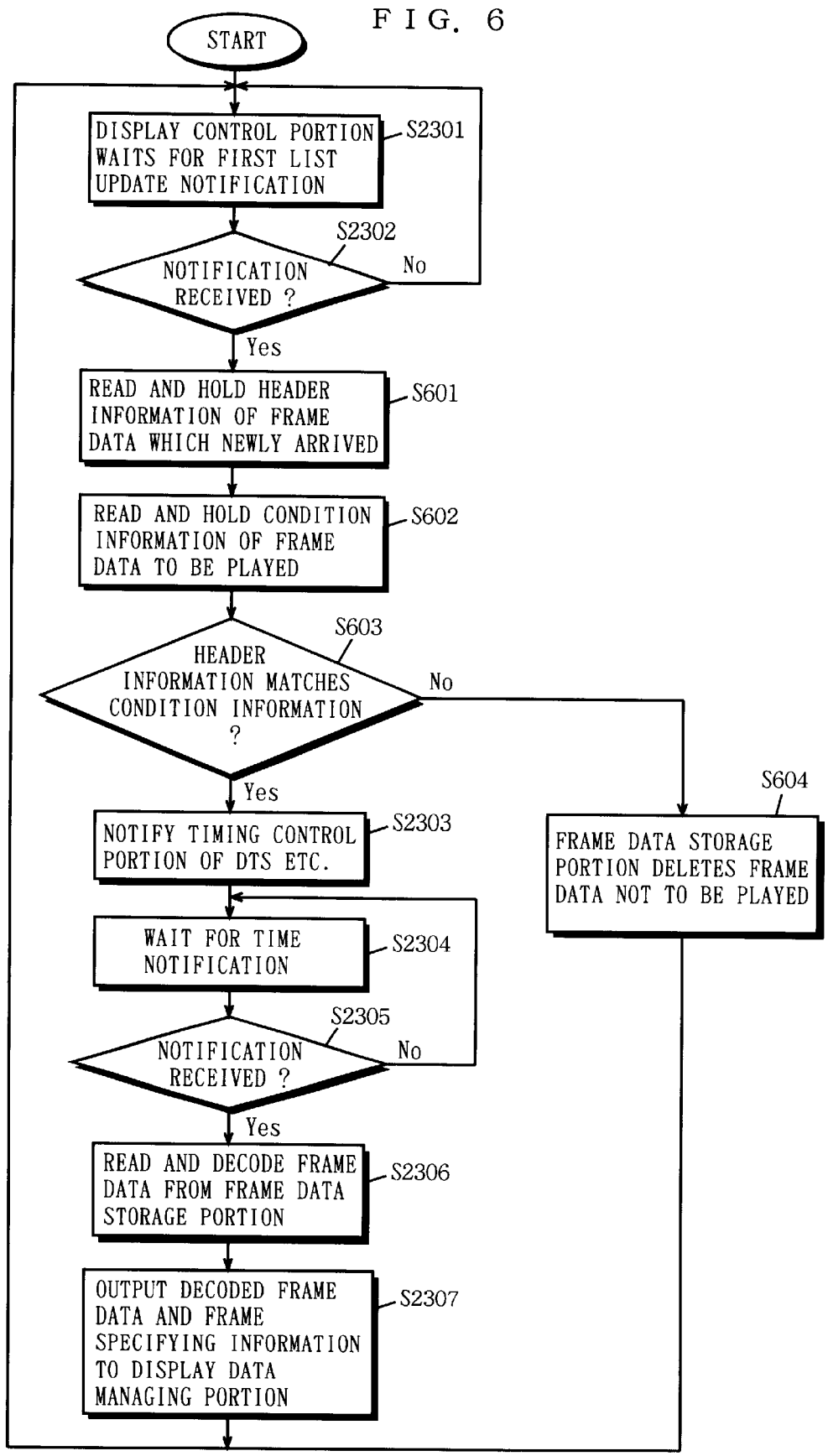
FIG. 6 is a f low chart showing a processing procedure executed by a decode processing portion 1603 shown in FIG. 4.

Described next is a processing procedure of the decode processing portion 1603 referring to a flow chart shown in FIG. 6. The flow chart shown in FIG. 6 is different compared to that shown in FIG. 29 in that steps S601 to S604 are further included. Other than that, the flow chart of FIG. 6 is the same as the flowchart of FIG. 29, and thus the same step numbers are provided for the steps corresponding to those of FIG. 29 and their description is simplified.

The decode processing portion 1603 executes the processing procedure shown in steps S2301 and S2302 of FIG. 6 (refer to the above), and when notified that new frame data arrived, the decode processing portion 1603 accesses the header information storage portion 1608 (refer to FIG. 5) to read its PTS from the first list and then holds PTS (FIG. 6; step S601). Next, the decode processing portion 1603 accesses the display frame condition storage portion 112 to read all PTSes as the condition information of the frame data to be played from the storage area of the display frame storage portion 112 and then holds PTSes (step S602). Then, the decode processing portion 1603 determines whether or not PTS of the frame data which arrived exists in PTSes as the condition information (step S603). When determining positively, the decode processing portion 1603 executes the processing procedure shown in steps S2303→S2304→S2305→S2306→S2307 (refer to the above). As a result, the decoded frame data according to its DTS and the frame specifying information are outputted to the display data managing portion 1604.

Here, assuming that the frame data I2 newly arrived, the decode processing portion 1603 reads PTS "0x24000" from the first list. This PTS "0x24000" matches PTS as the condition information shown in FIG. 3, and thus the frame data I2 is decoded and then outputted with its frame specifying information to the display data managing portion 1604.

By the way, when determining that the header information does not match the condition information in step S603, the decode processing portion 1603 outputs the held PTS to request the frame data storage portion 1602 to delete frame data not to be played (step S604). In response to the request, the frame data storage portion 1602 deletes the frame data stored therein based on simultaneously inputted PTS.

The decode processing portion 1603 executes the processing procedure in the above steps S2301→S2302→S601→S602-→S603 also when, for example, the frame data I1 is inputted to the present still picture player. However, since its PTS does not match the condition information, the decode processing portion 1603 determines that the frame data I1 should not be played and executes processing in step S604. As a result, the frame data I1 is deleted from the storage area of the frame data storage portion 1602.

Figure 30:
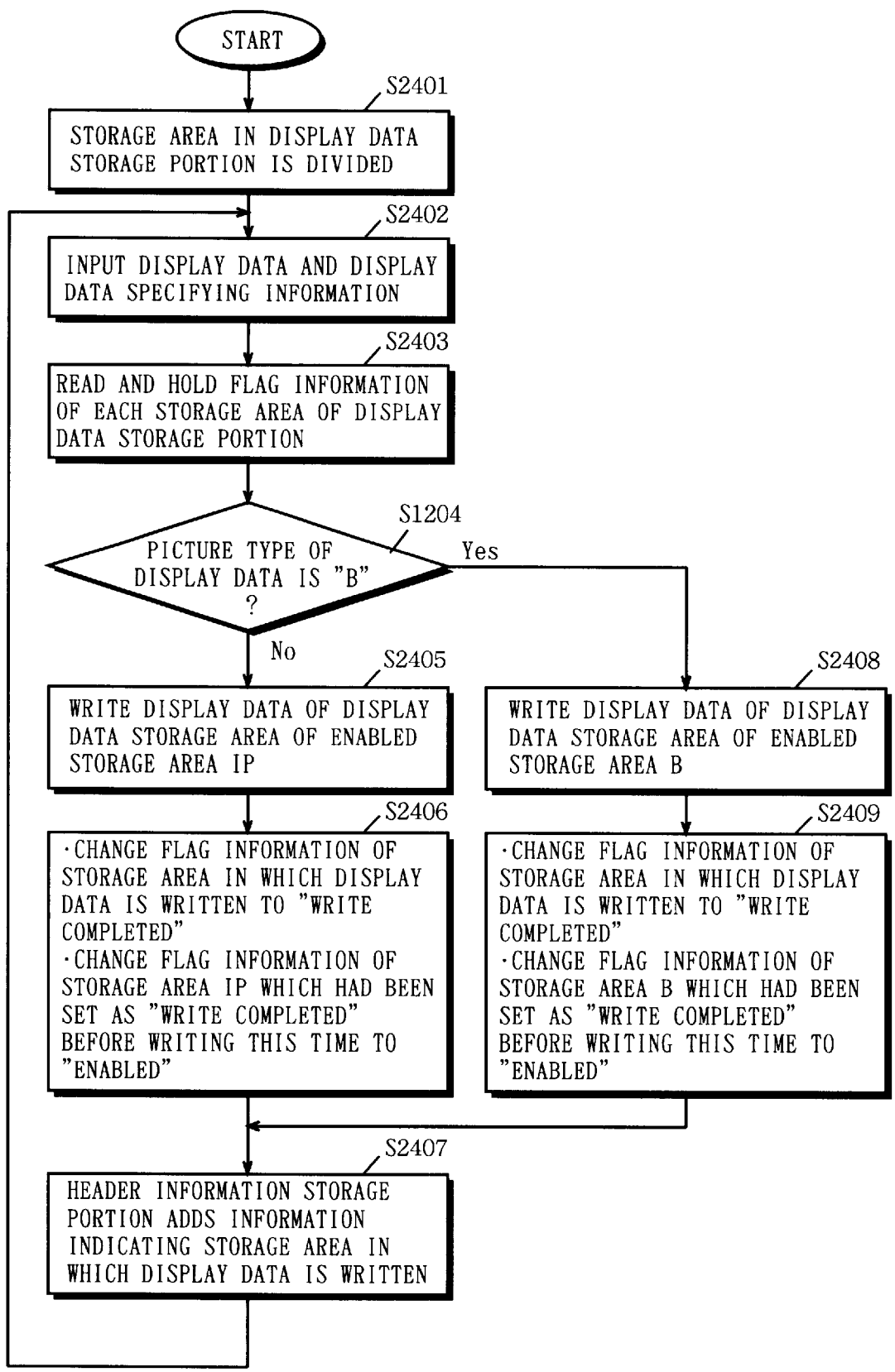
FIG. 30 is a flow chart showing a processing procedure by a display data storing processing part that consists of a display data managing portion 1604 and a display data storage portion 1605 shown in FIG. 22.

Next, since the display data managing portion 1604 and the display data storage portion 1605, which form a display data storing processing part, execute the processing procedure shown in the flow chart of FIG. 30, its description is omitted. However, as is evident from FIG. 1, the frame data includes only I pictures, and thus it is not necessary to use the storage areas B[0] and B[1] and execute steps S2404, S2408 and S2409 of FIG. 30.

Figure 7:
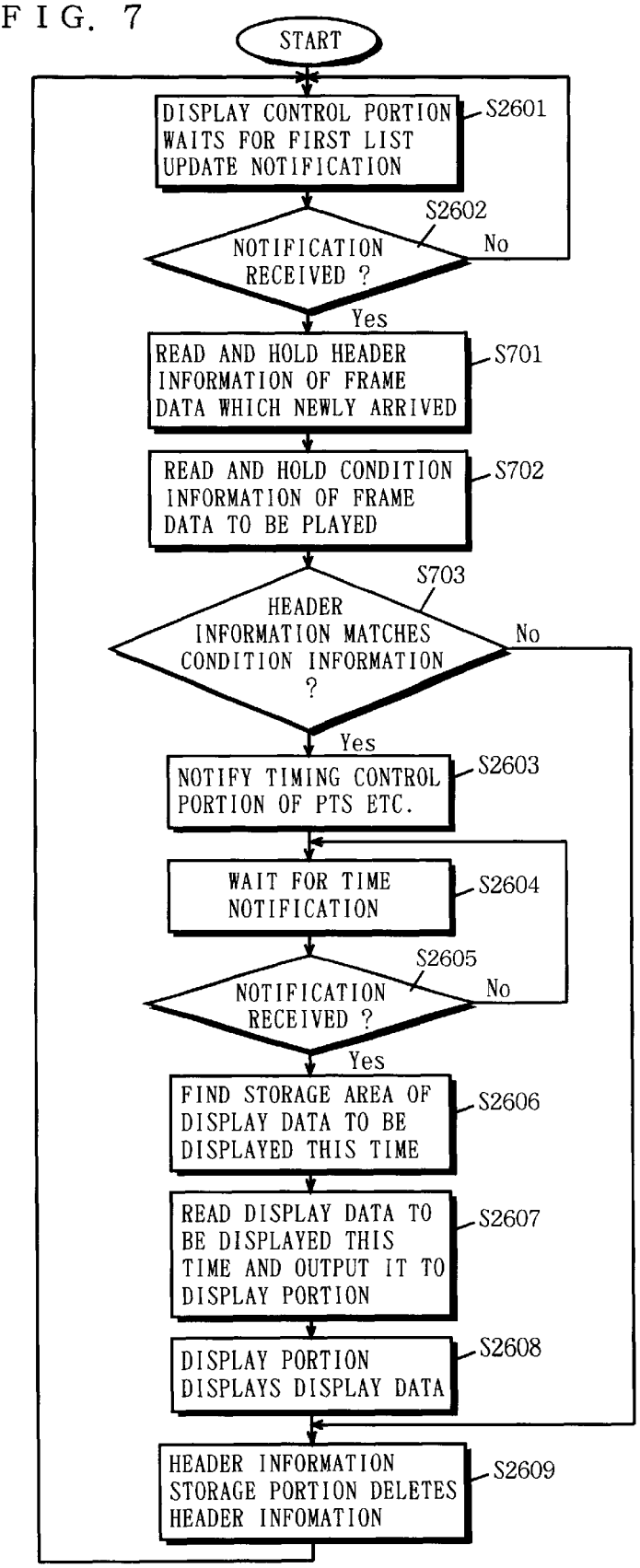
FIG. 7 is a flow chart showing a processing procedure by a still picture display part that consists of a display control portion 1606 and a display portion 1607 shown in FIG. 4.
Figure 32:
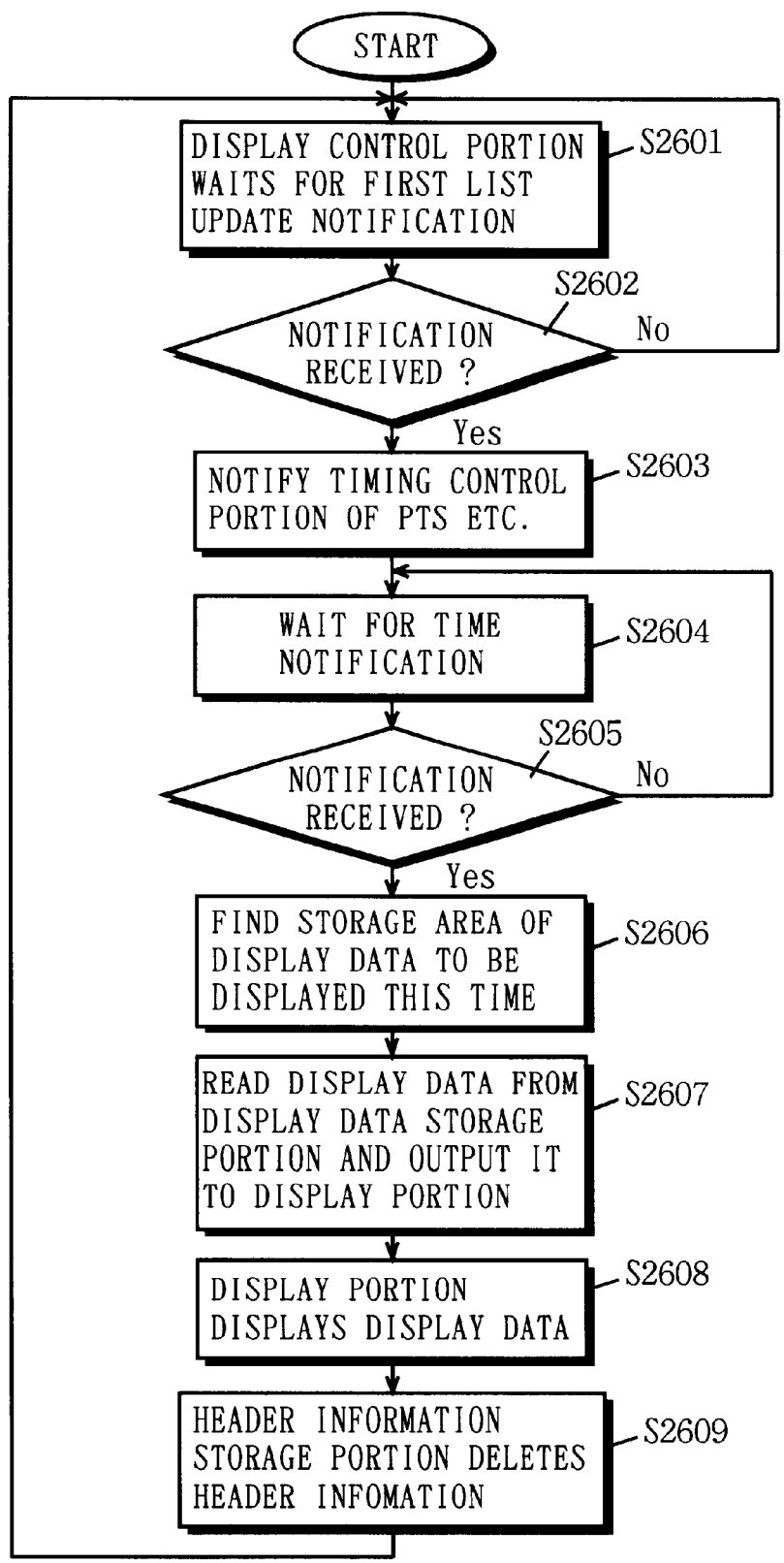
FIG. 32 is a flow chart showing a processing procedure by a video display part that consists of a display control portion 1606 and a display portion 1607 shown in FIG. 22.

Described next is a processing procedure of the display control portion 1606 and the display portion 1607, which form a still picture display part, referring to a flow chart shown in FIG. 7. The flow chart shown in FIG. 7 is different compared to that shown in FIG. 32 in that steps S701 to S703 are further included. Other than that, the flow chart of FIG. 7 is the same as the flow chart of FIG. 32, and thus the same step numbers are provided for the steps corresponding to those of FIG. 32 and their description is simplified.

The display control portion 1606 executes the processing procedure shown in steps S2601 and S2602 of FIG. 7 (refer to the above), and when notified that new frame data arrived, the display control portion 1606 accesses the header information storage portion 1608 (refer to FIG. 5) to read its PTS from the first list and then holds PTS (FIG. 7; step S701). Next, the display control portion 1606 accesses the display frame condition storage portion 112 to read all PTSes of the frame data to be played as the condition information from its storage area and then holds PTSes (step S702). Then, the display control portion 1606 determines whether or not PTS of the frame data which arrived exists in PTSes as the condition information (step S703). When the display control portion 1606 determines positively, the display control portion 1606 or the display portion 1607 executes the processing procedure shown in steps S2603→S2604→S2605→S2606→S2607→S2608 (refer to the above). As a result, the display control portion 1606 continues to access display data to be displayed this time in the aforesaid storage area at regular time intervals according to its PTS, and the display portion 1607 displays the display data read by this access.

At this point, assuming that the frame data I2 newly arrived, since its PTS "0x24000" matches PTS as the condition information shown in FIG. 3, thus the frame data I2 is written in the storage area IP[0], for example, and when the present time reaches PTS "0x24000", the frame data I2 is read by the display control portion 1606 and displayed by the display portion 1607.

The display control portion 1606 reads the display data, and then the header information storage portion 1608 deletes the stored data about the display data displayed this time (the header information and the information indicating the storage area) from the first list (step S2609). According to the above assumption, as to the displayed display data I2, "0xE0", "0x24000", "0x16000", "I", "2" and IP[0] (refer to FIG. 5) are deleted.

By the way, when determining that the header information does not match the condition information in step S703, the display control portion 1606 outputs the held PTS and the header information storage portion 1608 deletes the stored data about the frame data abandoned by the frame data storage portion 1602 (the frame data not to be played) from the first list (step S2609).

The display control portion 1606 executes the processing procedure in the above steps S2601→S2602→S701→S703 also when, for example, the frame data I1 is inputted to the present still picture player. However, since its PTS does not match the condition information, the display control portion 1606 determines that the frame data I1 has already been abandoned and goes on directly to step S2609 to execute the above processing. As a result, the header information storage portion 1608 deletes "0xE0", "0x21000", "0x13000", "I"and "1"of the frame data I1 from the first list held therein. FIG. 5 further shows a state of the first list after this deletion.

As described above, the display data managing portion 1604 and the display control portion 1606 form the toggle processing portion 114. Execution of the above described processing procedure by the display data managing portion 1604 and the display control portion 1606 results in toggle processing by the toggle processing portion 114 to the display data storage portion 1605 referring to the header information storage portion 1608. That is, the display data managing portion 1604 writes the decoded frame data in an enabled storage area IP (for example, IP[0]). During this writing, the display control portion 1606 reads display data from a storage area with write completed (for example, IP[1]) according to PTS. This is the same as in the conventional video player. However, the decode processing portion 1603 decodes to output only the frame data to be played and the display data managing portion 1604 writes only the display data to be played in a storage area in the display data storage portion 1605. Thus, the display control portion 1606 continues to access at regular time intervals another storage area in which display data has already been written until the present time reaches PTS of the display data to be played next, and the display portion 1607 displays the display data read by this access. According to the above specific example, the frame data I0 is continued to be read from the storage area IP[1] until the present time reaches PTS of the frame data I2 written in the storage area IP[0]. Therefore, even when the above toggle processing is executed, display switching of the still picture is smoothly made without a blackout. Thus, the still picture player according to the second embodiment continues to selectively display only the still picture that matches the set condition, that is, the required still picture (for example, still picture specified by the viewer), from among the inputted still pictures without a blackout.

Figure 8:
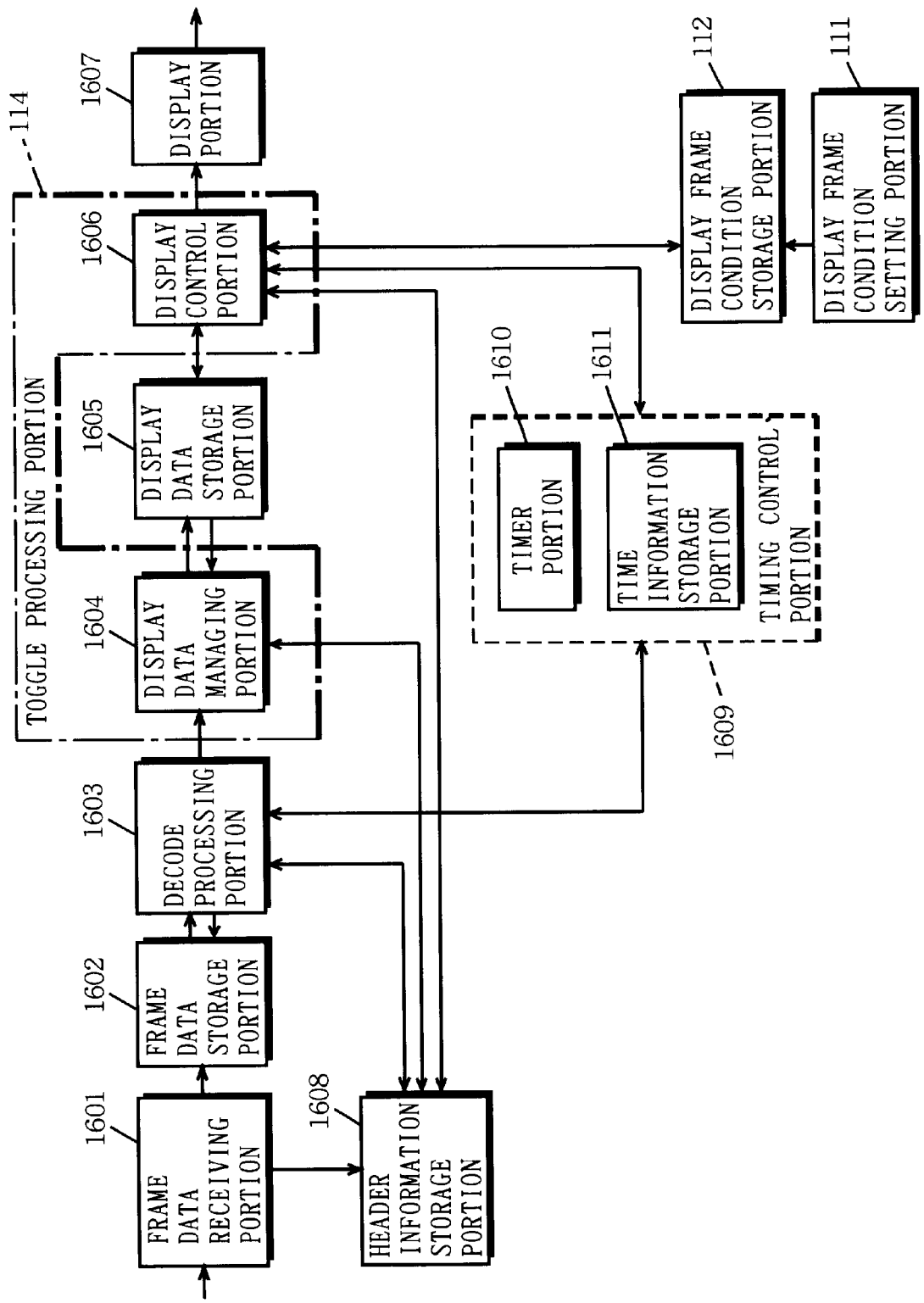
FIG. 8 is a block diagram showing the structure of a still picture player according to a third embodiment of the present invention.

FIG. 8 is a block diagram showing the structure of a still picture player according to a third embodiment of the present invention. The still picture player of FIG. 8 is different compared to the video player of FIG. 22 in that a display frame condition setting portion 111 and a display frame condition storage portion 112 are further included and that the display data managing portion 1604 and the display control portion 1606 form a toggle processing portion 114 (refer to the part surrounded by a chain line). Other than that, the still picture player of FIG. 8 is the same as that of FIG. 22, and thus in FIG. 8, the same reference numerals are provided for the structures corresponding to those of FIG. 22. However, processing executed by a display data storing processing part (the display data managing portion 1604 and the display data storage portion 1605) and a still picture display part (the display control portion 1606 and the display portion 1607) shown in FIG. 8 is different from that executed by the corresponding structure in FIG. 22. Therefore, described below is an operation of the still picture player shown in FIG. 8, particularly the differences from the video player shown in FIG. 22.

Also sequentially inputted to the present still picture player are the frame data I0, I1, . . . shown in FIG. 1. For clear description, also in the present embodiment, assume that the present still picture player displays a menu based on the frame data I0 at present.

Since the display frame condition setting portion 111 and the display frame condition storage portion 112 execute the same processing procedure as that executed by the corresponding structure in FIG. 2, its description is simplified. That is, the display frame condition setting portion 111 outputs, in response to specification by the viewer's side, PTS as the condition information to the display frame condition storage portion 112, and the inputted PTS as the condition information of the condition information is stored in the storage area of the display frame condition storage portion 112, as shown in FIG. 3.

After that, when the frame data receiving portion 1601 receives the frame data, the frame data receiving part, which consists of the frame data receiving portion 1601, the frame data storage portion 1602 and the header information storage portion 1608, executes the processing procedure shown in the flow chart of FIG. 25. Thus, its detailed description is omitted. As described above, stored in the first list of the header information storage portion 1608 is the header information of only I pictures as shown in FIG. 5.

Further, the timing control portion 1609 executes the processing procedure shown in the flow chart of FIG. 27 and therefore its detailed description is omitted.

Figure 29:
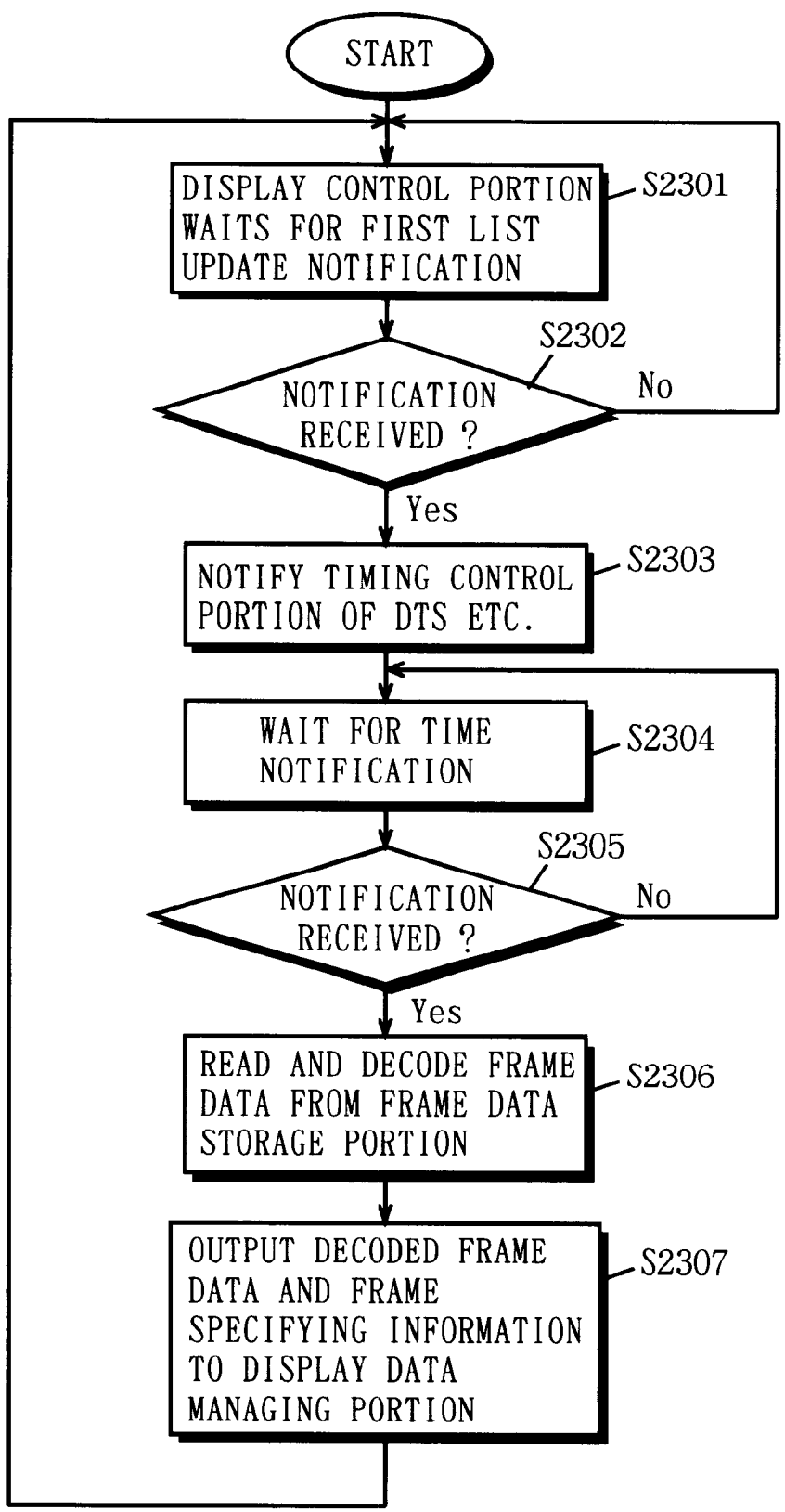
FIG. 29 is a flow chart showing a processing procedure by a decode processing portion 1603 shown in FIG. 22.

Further, the decode processing portion 1603 executes the processing procedure shown in the flow chart of FIG. 29 and therefore its detailed description is omitted.

Figure 9:
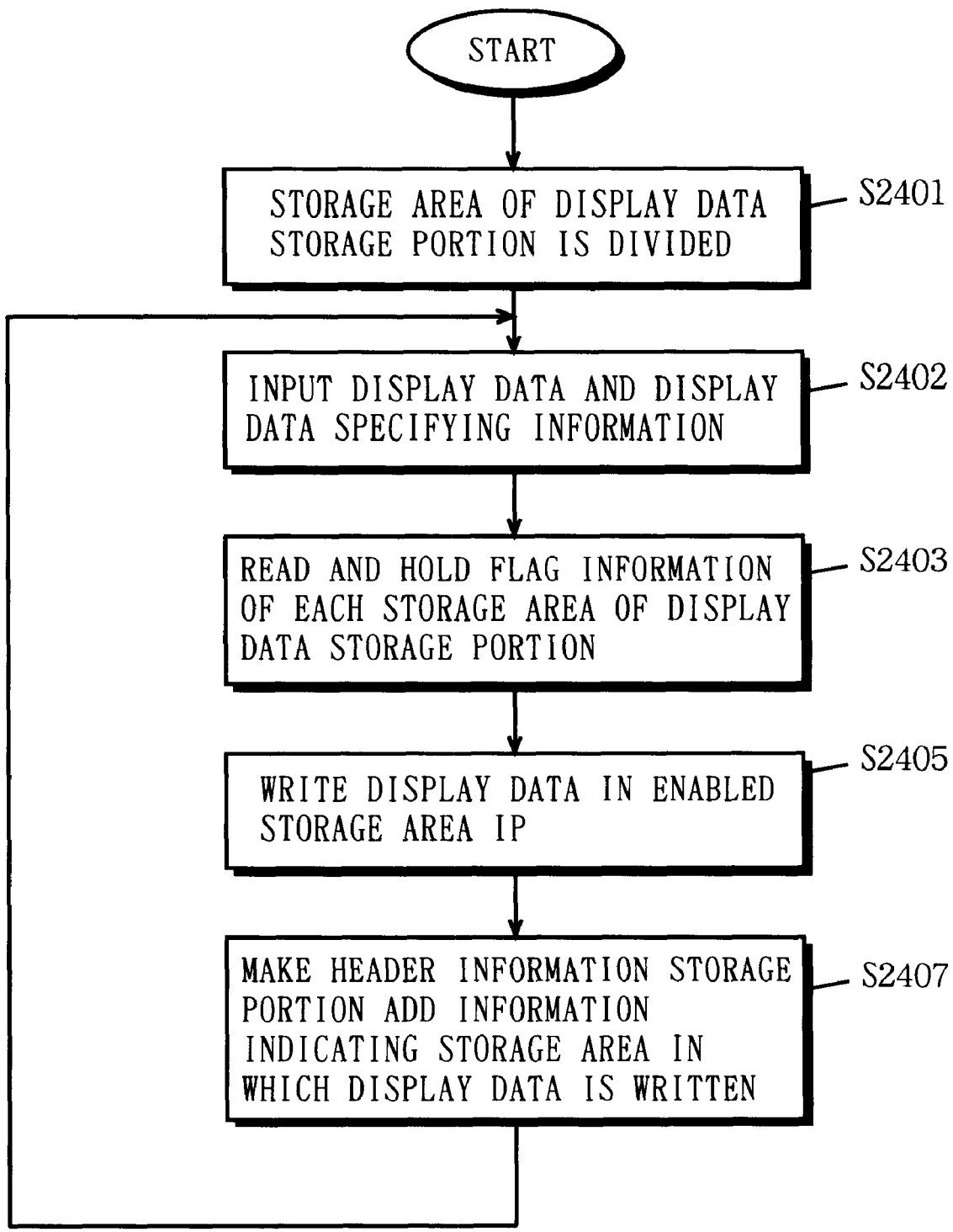
FIG. 9 is a flow chart showing a processing procedure by a decode data storing processing part that consists of a display data managing portion 1604 and a display data storage portion 1605 shown in FIG. 8.

Described next is a processing procedure of the display data storing processing part (the display data managing portion 1604 and the display data storage portion 1605) referring to a flow chart shown in FIG. 9. The flow chart shown in FIG. 9 is different compared to that shown in FIG. 30 in that only steps S2401, S2402, S2403, S2405 and S2407 are included. Other than that, the flow chart of FIG. 9 is the same as the flow chart of FIG. 30, and thus the same step numbers are provided for the steps corresponding to those of FIG. 29 and their description is simplified. Described below is the processing procedure of the display data storing processing part.

Figure 31:
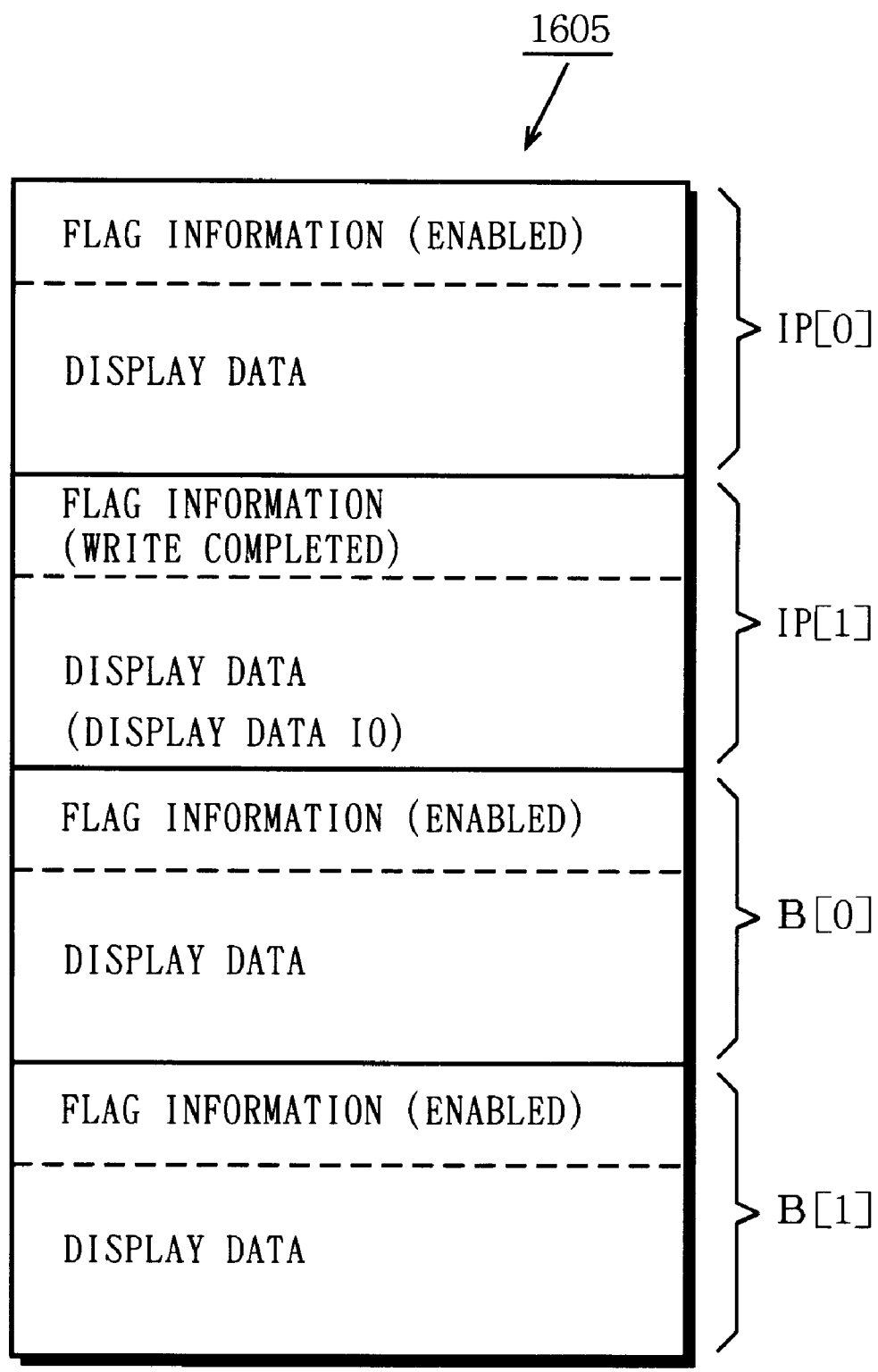
FIG. 31 is a diagram showing the more detailed structure of the display data storage portion 1605 shown in FIG. 22.

First, at the time of initialization and the like, the storage area of the display data storage portion 1605 is divided into storage areas IP[0], IP[1], B[0] and B[1] as shown in FIG. 31 (FIG. 9; step S2401). At the time of initialization, four pieces of flag information are set to "enabled". Next, when the display data and the display data specifying information are inputted from the decode processing portion 1603, (step S2402), the display data managing portion 1604 holds the display data and the display data specifying information. The display data managing portion 1604 then reads the presently set flag information from each storage area of the display data storage portion 1605 and holds the flag information (step S2403). The display data managing portion 1604 then writes the held display data in a display data storage area of one enabled storage area IP among all storage areas IP (step S2405). The display data managing portion 1604 then requests the header information storage portion 1608 to add information indicating the storage area in which the display data is written this time to the aforesaid storage area field in the first list shown in FIG. 5 (step S2407).

Figure 10:
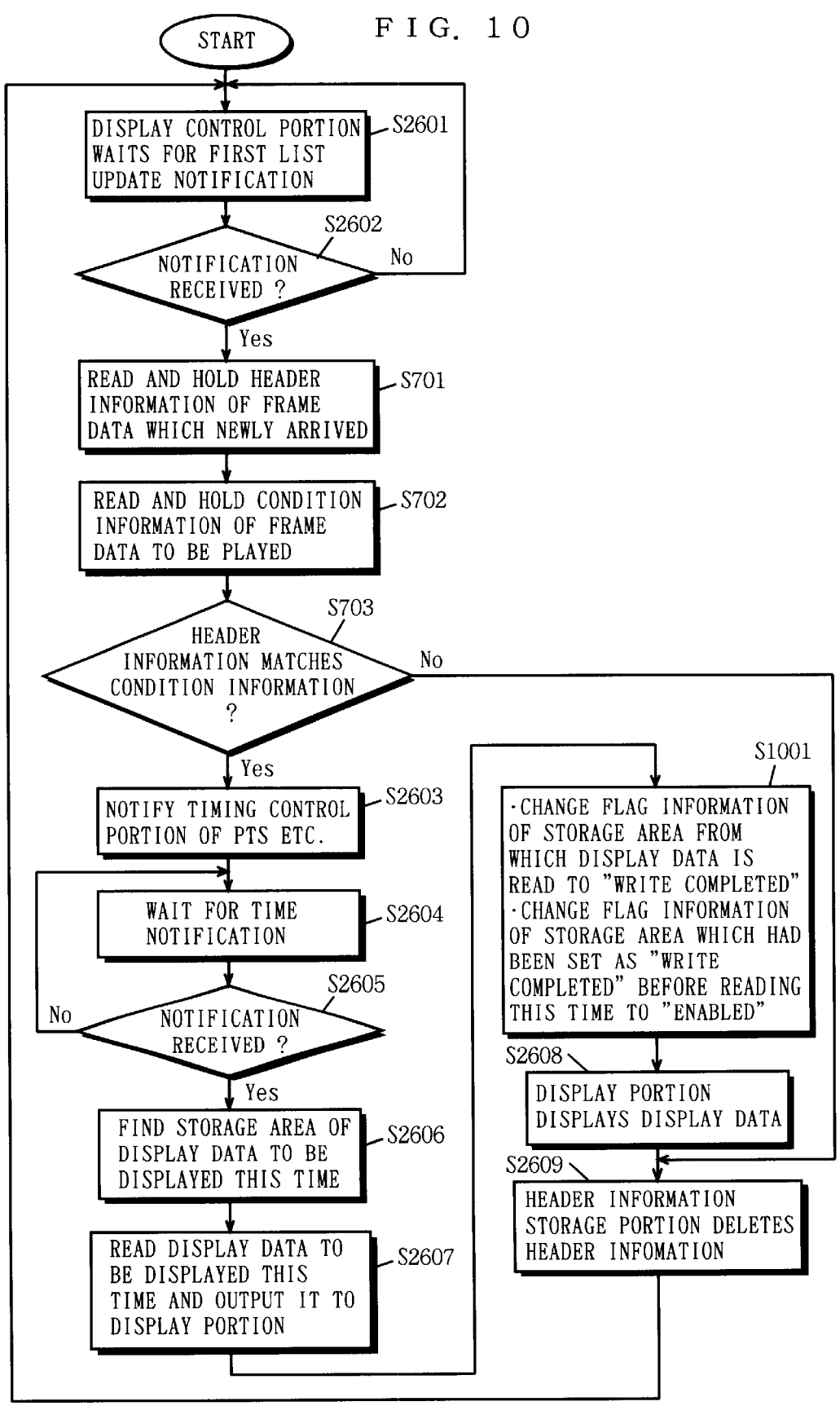
FIG. 10 is a flow chart showing a processing procedure by a still picture display part that consists of a display control portion 1606 and a display portion 1607 shown in FIG. 8.

Described next is a processing procedure of the still picture display part (the display control portion 1606 and the display portion 1607) referring to a flow chart shown in FIG. 10. The flow chart shown in FIG. 10 is different compared to that shown in FIG. 7 in that step S1001 is further included. Other than that, the flow chart of FIG. 10 is the same as that of FIG. 7, and thus the same step numbers are provided for the steps corresponding to those of FIG. 7 and their description is simplified.

The display control portion 1606 executes the processing procedure shown in steps S2601→S2602→S701 of FIG. 10 (refer to the above), and when notified that new frame data arrived, the display control portion 1606 reads its PTS from the first list of the header information storage portion 1608 (refer to FIG. 5) and then holds PTS (FIG. 10; step S701). Next, the display control portion 1606 reads the entire condition information (PTSes of the frame data to be played) from the storage area of the display frame condition storage portion 112 and then holds the information(step S702). Then, the display control portion 1606 determines whether or not PTS of the frame data which arrived exists in PTSes as the condition information (step S703). When the display control portion 1606 determines positively, the display control portion 1606 or the display portion 1607 executes the processing procedure shown in steps S2603→S2604→S2605→S2606→S2607 (refer to the above). As a result, the display control portion 1606 reads display data to be displayed this time from the aforesaid storage area according to its PTS, and outputs the display data to the display portion 1607.

Here, when the frame data which arrived is I2, the display control portion 1606 reads PTS "0x24000"from the first list. Since this PTS "0x24000"matches PTS as the condition information shown in FIG. 3, the frame data I2 is read from the storage area IP[0] in which it is written and then outputted.

Next, the display control portion 1606 changes the flag information of the flag information storage area of the storage area IP from which the display data displayed this time is read to "write completed", and changes the flag information of the storage area IP set as "write completed" before this reading to "enabled" (step S1001).

Further, the display portion 1607 displays the display data read by the display control portion 1606, as described above (step S2608).

The display control portion 1606 reads the display data and then the header information storage portion 1608 deletes the stored data about the display data displayed this time (the header information and the information indicating the storage area) from the first list (step S2609). In the above described case, the display data I2 is displayed, and as to the displayed display data I2, "0xE0", "0x24000", "0x16000", "I", "2" and IP[0] (refer to FIG. 5) are deleted from the first list.

By the way, as is the same in the second embodiment, when determining that the header information does not match the condition information of step S703, the display control portion 1606 outputs the held PTS and the header information storage portion 1608 deletes the stored data about the frame data not to be displayed from the first list (step S2609).

In this way, in the present embodiment, the decode processing portion 1603 decodes the entire arriving frame data. As described above, the display data managing portion 1604 and the display control portion 1606 form the toggle processing portion 114, and the toggle processing portion 114 executes toggle processing to the display data storage portion 1605 referring to the header information storage portion 1608. The display data managing portion 1604, which structures part of the toggle processing portion 114, writes the decoded frame data in a storage area assigned as an enabled second area (for example, IP[0]). During this writing, the display control portion 1606, which structures another part of the toggle processing portion 114, reads display data from a storage area assigned as the first area for reading the already written display data (for example IP[1]), according to PTS. In this point, the present embodiment is the same as the conventional video player. However, the present embodiment is different in that when the display data matches the condition information, the display control portion 1606 sets the flag information to "write completed" to assign the storage area IP[1] of the display data to be displayed as the first area. Thus, when the display data written next in the storage area IP[0] as the second area does not match the condition information, the display control portion 1606 continues to access at regular time intervals the storage area IP[1] currently assigned as the first area, and the display portion 1607 displays the display data read by this access. Thus, the display control portion 1606 continues to access at regular time intervals another storage area in which display data matching the condition has already been written until the present time reaches PTS of the display data to be played next, and the display portion 1607 displays the display data (for example, I2) read by this access. Thus, even when the above toggle processing is executed, display switching of the still picture is smoothly made without a blackout. Therefore, the still picture player according to the third embodiment continues to selectively display only the still picture that matches the set condition, that is, the required still picture (for example, still picture specified by the viewer), from among the inputted still pictures without a blackout.

By the way, when PTS of the frame data does not match the condition information of step S703, the change of the flag information of step S1001 is not executed, and thus the aforesaid storage area IP is assigned as a continuously enabled area. Therefore, the display data managing portion 1604 continuously writes frame data in the same storage area IP. As described above, when the display data matching the condition information (for example, I0) is written in the storage area IP[1], the display data I1 not matching the condition information is written in the storage area IP[0]. However, the frame data initially written in this storage area IP (for example, I1) is determined by the display control portion 1606 not to be displayed in the display portion 1607 and the display data I2 is overwritten on the display data I1 stored in the storage area IP[0], thereby causing no problem in toggle processing or still picture display processing.

Figure 11:
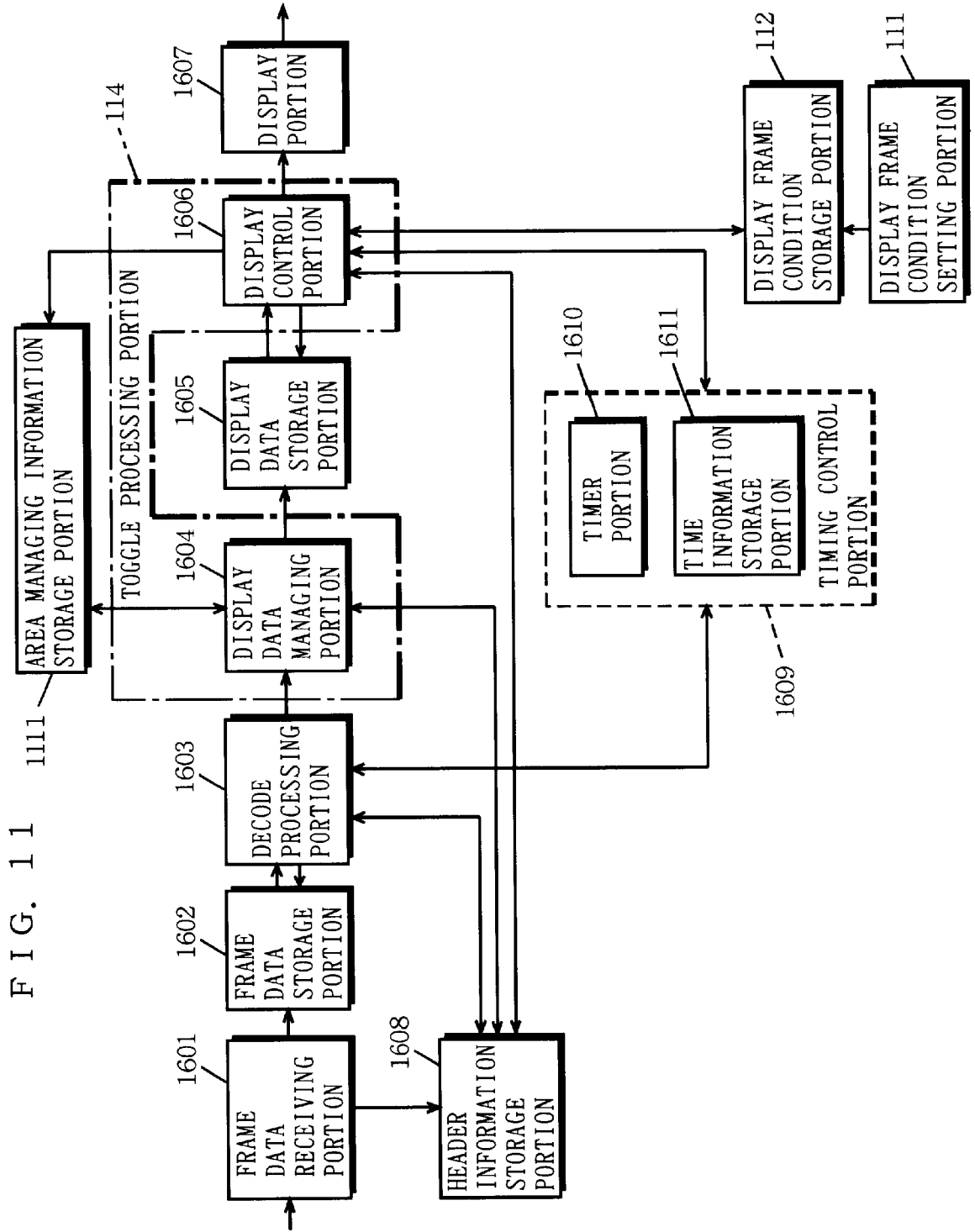
FIG. 11 is a block diagram showing the structure of a still picture player according to a fourth embodiment of the present invention.

FIG. 11 is a block diagram showing the structure of a still picture player according to a fourth embodiment of the present invention. The still picture player of FIG. 11 is different compared to that of FIG. 8 in that an area managing information storage portion 1111 is further included. Other than that, the still picture player of FIG. 11 is the same as that of FIG. 8, and thus in FIG. 11, the same reference numerals are provided for the structures corresponding to those of FIG. 8. However, processing executed by a display data storing processing part (the display data managing portion 1604 and the display data storage portion 1605) and a still picture display part (the display control portion 1606 and the display portion 1607) shown in FIG. 11 is different from that executed by the corresponding structures in FIG. 8. Therefore, described below is an operation of the still picture player according to the fourth embodiment, particularly, the differences from the still picture player shown in FIG. 8.

Also sequentially inputted to the present still picture player are the frame data I0, I1, . . . shown in FIG. 1. For clear description, also in the present embodiment, assume that the present still picture player displays a menu based on the frame data I0 at present.

Since the display frame condition setting portion 111 and the display frame condition storage portion 112 execute the same processing procedure as that executed by the corresponding structure in FIG. 2, its description is simplified. That is, the display frame condition setting portion 111 outputs, in response to specification by the viewer's side, PTS as the condition information to the display frame condition storage portion 112, and the inputted PTS as the condition information is stored in the storage area of the display frame condition storage portion 112, as shown in FIG. 3.

After that, when the frame data receiving portion 1601 receives the frame data, the frame data receiving part, which consists of the frame data receiving portion 1601, the frame data storage portion 1602 and the header information storage portion 1608, executes the processing procedure shown in the flow chart of FIG. 25 (refer to the above). Thus, its detailed description is omitted. As described above, stored in the first list of the header information storage portion 1608 is the header information of only I pictures, as shown in FIG. 5. Further, the timing control portion 1609 executes the processing procedure shown in the flow chart of FIG. 27 (refer to the above), and therefore its detailed description is omitted. Further, the decode processing portion 1603 executes the processing procedure shown in the flow chart of FIG. 29 (refer to the above), and therefore its detailed description is omitted.

Figure 12:
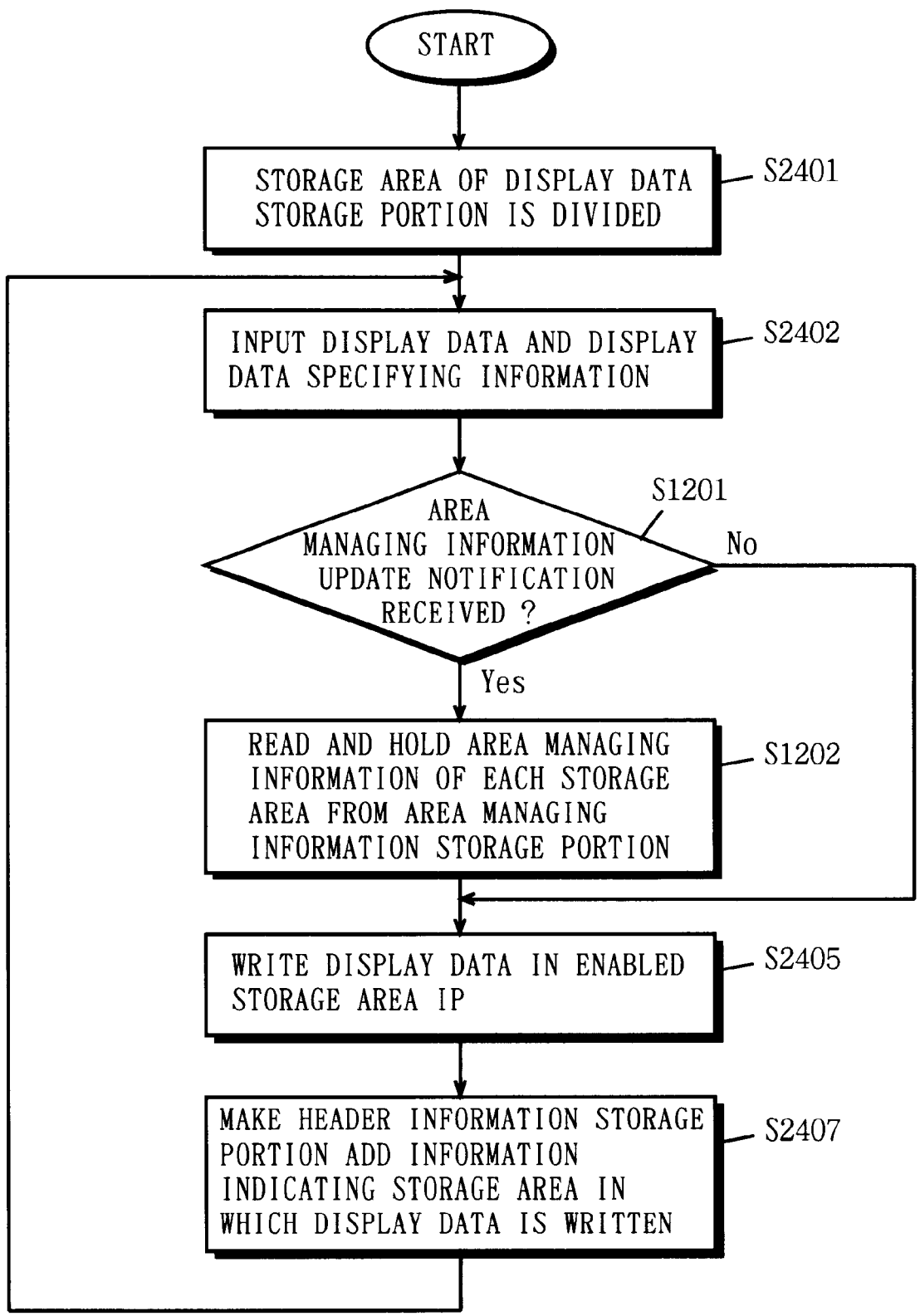
FIG. 12 is a flow chart showing a processing procedure by a display data storing processing part that consists of a display data managing portion 1604 and a display data storage portion 1605 shown in FIG. 11.

Described next is a processing procedure of the display data storing processing part (the display data managing portion 1604 and the display data storage portion 1605) referring to a flow chart shown in FIG. 12. The flow chart shown in FIG. 12 is different compared to that shown in FIG. 9 in that in place of step S2403, steps S1201 and S1202 are included. Other than that, the flow chart of FIG. 12 is the same as that of FIG. 9. Therefore, the same step numbers are provided for the steps corresponding to those of FIG. 9 and their description is simplified.

Figure 23:
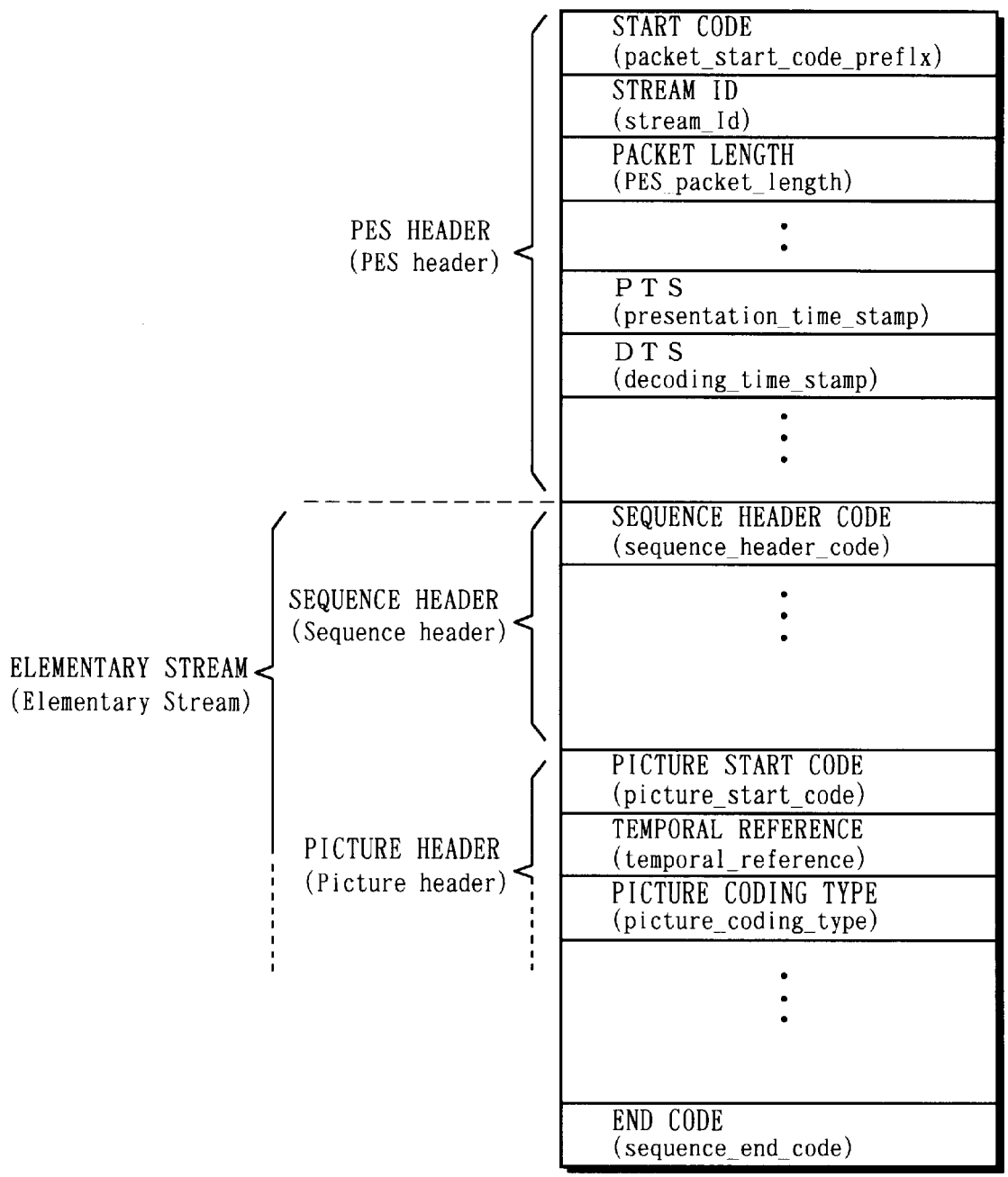
FIG. 23 is a diagram showing a format of frame data structuring video to be inputted to the video player shown in FIG. 22.

First, at the time of initialization and the like, the storage area of the display data storage portion 1605 is divided as shown in FIG. 23 (FIG. 12; step S2401) and each piece of flag information is set to "enabled".

When the display data and the display data specifying information are inputted from the decode processing portion 1603, (step S2402) the display data managing portion 1604 holds the display data and the display data specifying information. The display data managing portion 1604 then determines whether or not area managing information update notification from the area managing information storage portion 1111 is inputted at predetermined timing (step S1201), and when the update notification is inputted, the display data managing portion 1604 goes on to step S1202. On the other hand, when the notification is not inputted, the display data managing portion 1604 goes on directly to step S2405.

Described here is the area managing information storage portion 1111. As described above, set in each storage area of the display data storage portion 1605 is the flag information. The area managing information storage portion 1111 holds a third list having fields in which information indicating the storage area and the flag information set by the display control portion 1606 are set, and thereby stores the area managing information of each storage area. The area managing information storage portion 1111 outputs area managing information update notification to the display data managing portion 1604 every time the third list is updated.

When going on to step S1202, the display data managing portion 1604 accesses the area managing information storage portion 1111 to read the area managing information of the storage areas IP[0] and IP[1] of the display data storage portion 1605 and hold them (step S1202). The display data managing portion 1604 then selects an enabled storage area IP based on the held area managing information and writes the held display data in the display data storage area of the selected storage area IP (step S2405).

The header information storage portion 1608 adds information indicating the storage area in which the display data is written to the field of the storage area corresponding to the display data written this time (step S2307).

Figure 13:
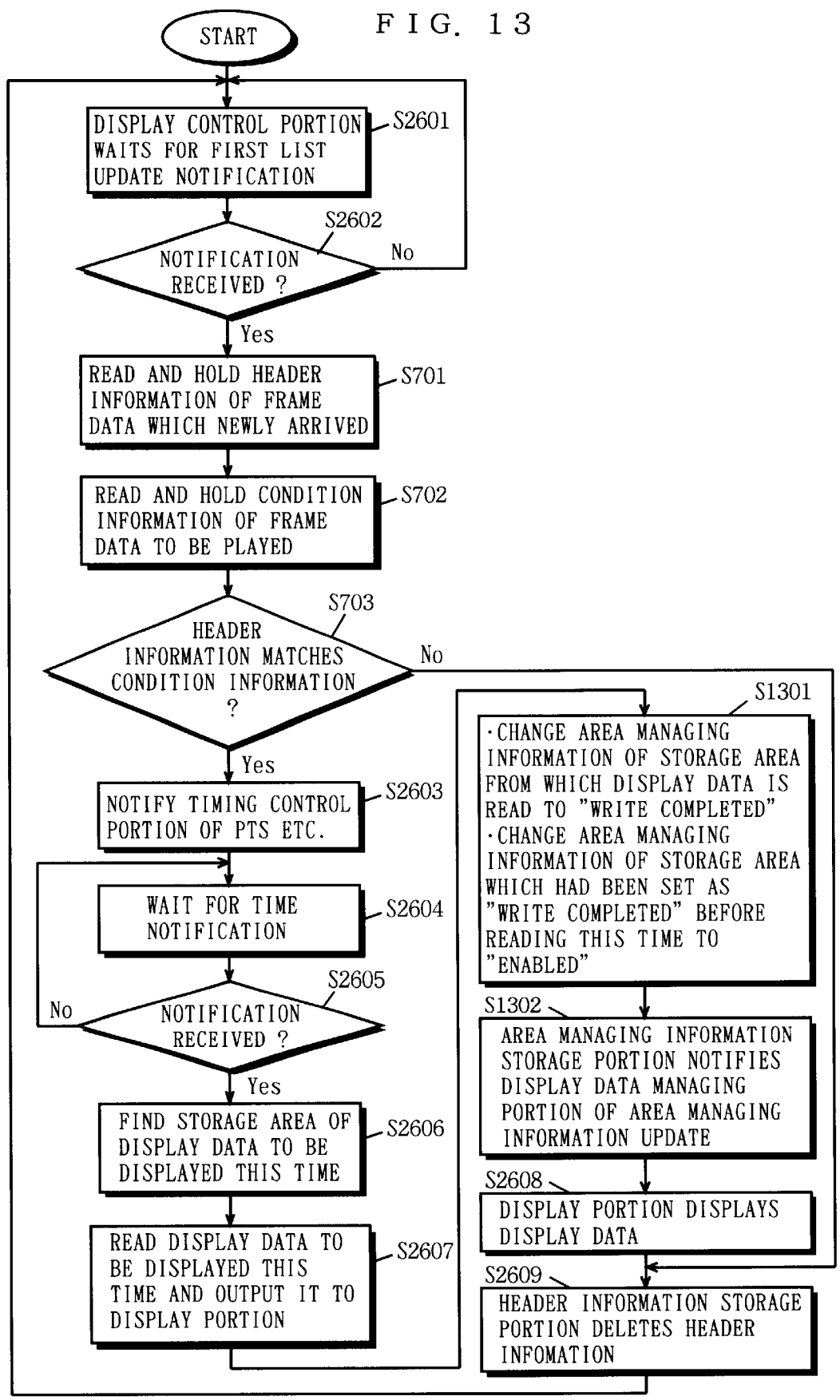
FIG. 13 is another flow chart showing a processing procedure by the still picture display part that consists of the display control portion 1606 and the display portion 1607 shown in FIG. 8.

Described next is a processing procedure of the still picture display part (the display control portion 1606 and the display portion 1607) referring to a flow chart shown in FIG. 13. The flow chart of FIG. 13 is different compared to that of FIG. 10 in that in place of step S1001, steps S1301 and S1302 are further included. Other than that, the flow chart of FIG. 13 is the same as that of FIG. 10. Therefore, the same step numbers are provided for the steps corresponding to those of FIG. 10 and their description is simplified.

The display control portion 1606 executes the processing procedure shown in steps S2601→S2602→S701→S702 of FIG. 13 (refer to the above) to read and hold PTS of the frame data which newly arrived and PTS as the condition information (refer to FIG. 3). The display control portion 1606 then determines whether or not PTS of the frame data which arrived matches the above condition information (step S703). When the frame data matches the condition information, the display control portion 1606 goes on to step S2603, and when the frame data does not match the condition information, the display control portion 1606 goes on to step S2609.

When going on to step S2603, the display control portion 1606 executes steps S2603 to S2607 to read the display data to be displayed this time and output the display data to the display portion 1607.

The display control portion 1606 then executes setting of the flag information of the storage areas IP[0] and IP[1], setting the present state of the flag information as the area managing information of the above third list (step S1301). At this point, assume that the display data is read from the storage area IP[0]. In this case, the display control portion 1606 sets the flag information of the storage area IP[0] to "write completed" and the storage area IP[1] to "enabled", and then writes the storage area IP[0] and "write completed"; and the storage area IP[1] and "enabled"; as the area managing information of the third list. Thus, at this point, the display data managing portion 1604 cannot write display data in the storage area IP[0].

When the third list is updated by the display control portion 1606, the area managing information storage portion 1111 outputs the above described area managing information update notification to the display data managing portion 1604 (step S1302). In response to the update notification, the display data managing portion 1604 executes step S1202 described above.

The display portion 1607 displays the display data inputted from the display control portion 1606 (step S2608). The header information storage portion 1608 deletes the information stored in the first list (the header information and the information indicating the storage area) as to the display data displayed this time from the first list (step S2609).

By the way, when the display control portion 1606 goes on directly to step S2609 by the determination in step S703, as described in the third embodiment referring to FIG. 7, only required is deletion of the header information.

In this way, like the still picture player according to the third embodiment, in the still picture player according to the present embodiment, the entire frame data (I pictures) is decoded and then stored in enabled storage areas IP of the display data storage portion 1605. At this time, the display control portion 1606 which structures part of the toggle processing portion 114 properly selects only the display data matching the display condition and continues to read the display data at regular time intervals. The display portion 1607 displays the read display data. Thus, the display control portion 1606 continues to access at regular time intervals another storage area in which display data matching the condition has already been written until the present time reaches PTS of the display data to be played next (for example, I2), and the display portion 1607 displays the display data (for example, I0) read by this access. Thus, the still picture player according to the fourth embodiment continues to selectively display only the still picture that matches the set condition, that is, the required still picture (for example, still picture specified by the viewer), from among the inputted still pictures without a blackout.

By the way, when PTS of the frame data does not match the condition information of step S703, the update and its notification of the area managing information of steps S1301 and S1302 are not executed, and thus like the still picture player according to the third embodiment, the aforesaid storage area IP is assigned as a continuously enabled area. At this time, the display managing portion 1604 writes the frame data successively twice in the same storage area IP. However, as described above, the frame data initially written in this storage area IP is determined by the display control portion 1606 not to be displayed in the display portion 1607, thereby causing no problem in toggle processing or still picture display processing.

Figure 14:
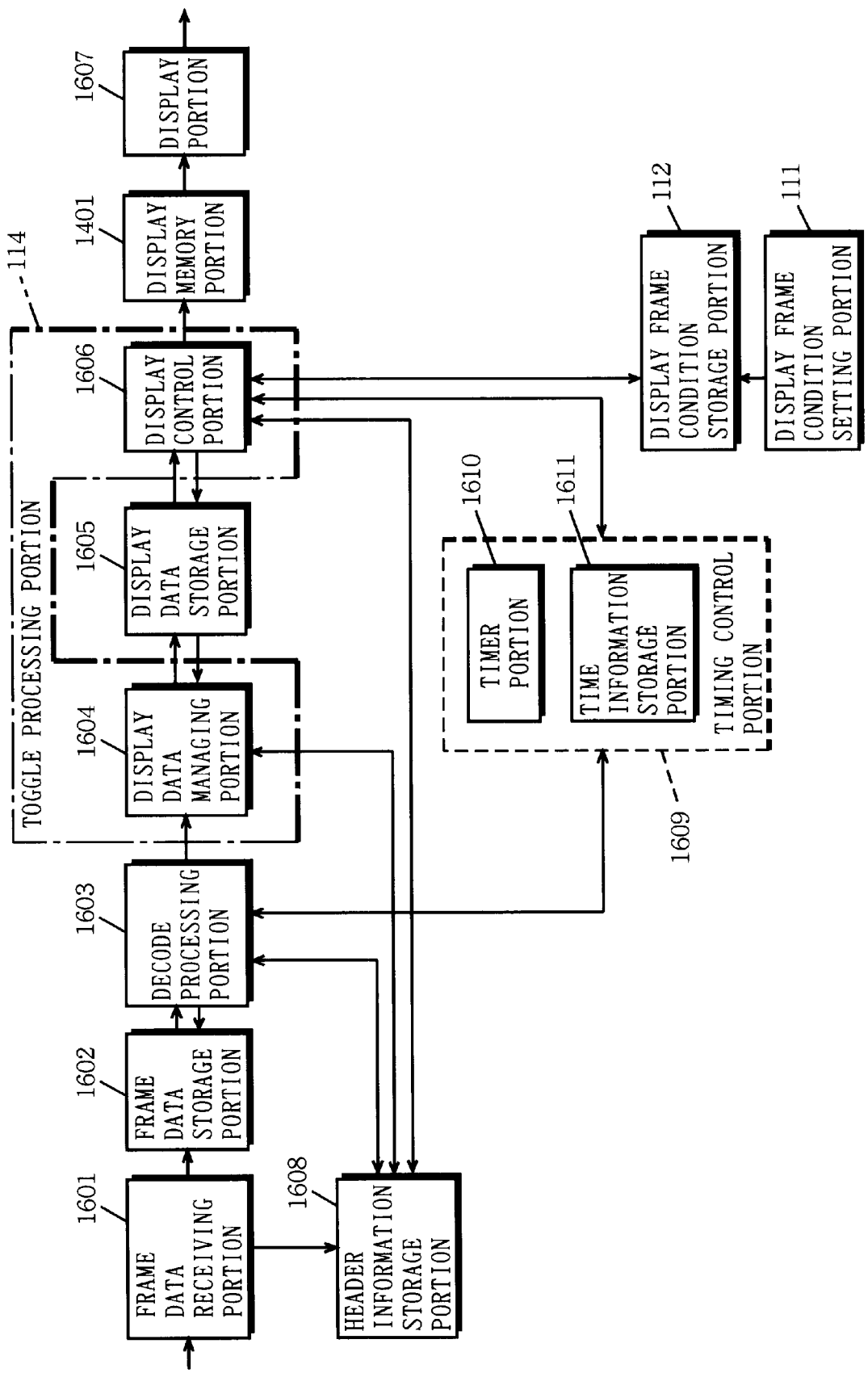
FIG. 14 is a block diagram showing the structure of a still picture player according to a fifth embodiment of the present invention.

FIG. 14 is a block diagram showing the structure of a still picture player according to a fifth embodiment of the present invention. The still picture player of FIG. 14 is different compared to that of FIG. 8 in that a display memory portion 1401 is further included. Other than that, the still picture player of FIG. 14 is the same as that of FIG. 8, and thus in FIG. 14, the same reference numerals are provided for the structures corresponding to those of FIG. 8. However, processing executed by a display data storage processing part (the display data managing portion 1604 and the display data storage portion 1605) and a still picture display part (the display control portion 1606, the display memory 1401 and the display portion 1607) shown in FIG. 14 is different from that executed by the corresponding structure in FIG. 8. Therefore, described below is an operation of the still picture player according to the fifth embodiment, particularly, the differences from that of FIG. 8.

Also sequentially inputted to the present still picture player are the frame data I0, I1, . . . shown in FIG. 1. For clear description, also in the present embodiment, assume that the present still picture player displays a menu based on the frame data I0 at present.

The display frame condition setting portion 111 and the display frame condition storage portion 112 execute the same processing procedure as that executed by the corresponding structure in FIG. 2. That is, the display frame condition setting portion 111 outputs, in response to specification by the viewer's side, PTS as the condition information to the following display frame condition storage portion 112, and the display frame condition storage portion 112 stores the inputted PTS as the condition information of its internal storage area as shown in FIG. 3.

After that, when the frame data is inputted to the frame data receiving portion 1601, the frame data receiving part, which consists of the frame data receiving portion 1601, the frame data storage portion 1602 and the header information storage portion 1608, executes the processing procedure shown in the flow chart of FIG. 25 (refer to the above). Thus, its detailed description is omitted. Here, set in the first list of the header information storage portion 1608 is only the header information about frame data as to I pictures as shown in FIG. 5.

Further, the timing control portion 1609 executes the processing procedure shown in the flow chart of FIG. 27 (refer to the above) and therefore its detailed description is omitted. When the present time reaches DTS or PTS included in the frame data which arrived, the timing control portion 1609 outputs time notification to the decode processing portion 1603 or the display control portion 1606 in step S2105. Further, the decode processing portion 1603 executes the processing procedure shown in the flow chart of FIG. 29 (refer to the above) and therefore its detailed description is omitted.

Further, the display data storing processing part (the display data managing portion 1604 and the display data storage portion 1605) executes steps S2401 to S2403→S2405→S2406→S2407 (refer to the above) in the processing procedure shown in FIG. 30 and therefore its detailed description is omitted.

Figure 15:
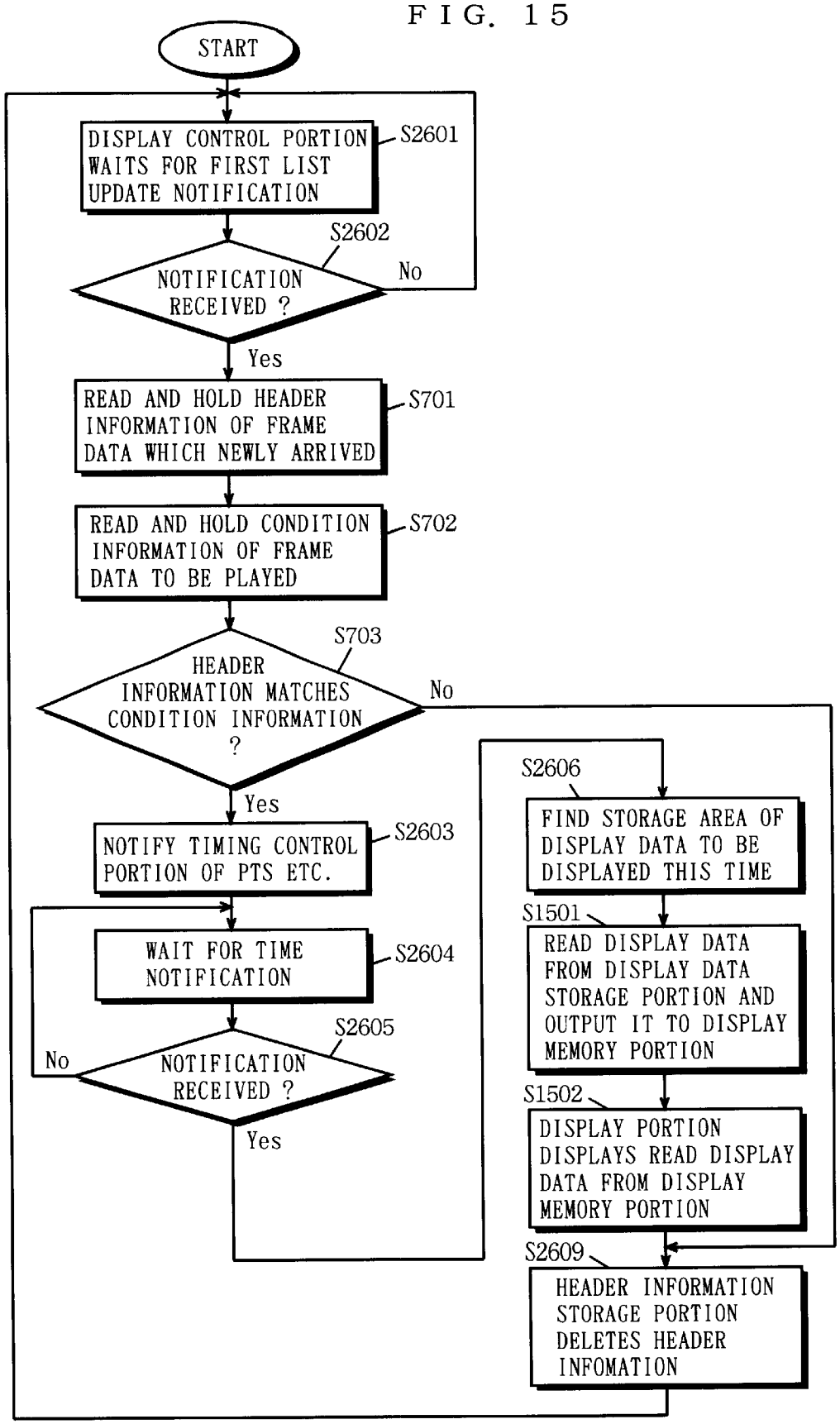
FIG. 15 is a flow chart showing a processing procedure by a still picture display part that consists of a display control portion 1606, a display memory portion 1401 and a display portion 1607 shown in FIG. 14.

Described next is a processing procedure by the still picture display part (the display control portion 1606, the display memory portion 1401 and the display portion 1607) referring to a flow chart shown in FIG. 15. The flow chart shown in FIG. 15 is different compared to that shown in FIG. 32 in that steps S701 to S703 are further included and that in place of steps S2607 and S2608, steps S1501 and S1502 are included. Other than that, the flow chart of FIG. 15 is the same as the flowchart of FIG. 32, and thus the same step numbers are provided for the steps corresponding to those of FIG. 32 and their description is simplified. Further, steps S701 to S703 are the same as the processing provided with the corresponding step numbers in FIG. 10 and therefore their description is also simplified.

The display control portion 1606 executes the above described steps S2601→S2602→S701, and when notified that new frame data arrived, reads its PTS from the first list of the header information storage portion 1608 (refer to FIG. 5) and holds it (step S701). The display control portion 1606 then reads the entire condition information (PTSes of the frame data to be played) from the storage area of the display frame condition storage portion 112 and holds the condition information (step S702). Then, the display control portion 1606 determines whether or not PTS of the inputted frame data exists in PTSes as the condition information (step S703). When determining positively, the display control portion 1606 executes the processing procedure shown in steps S2603→S2604→S2605→S2606 (refer to the above). As a result, the display control portion 1606 finds the storage area of the display data to be displayed this time according to its PTS.

Next, the display control portion 1606 reads the display data to be displayed this time from the storage area found by the above described processing and outputs the display data to the display memory portion 1401 (step S1501). The display portion 1607 continues to read the display data stored in the display memory portion 1401 at regular time intervals and displays the display data (step S1502). The display control portion 1606 reads the display data from its storage area and then the header information storage portion 1608 deletes the stored information about the display data to be displayed this time (the header information and the information indicating the storage area) from the first list (step S2609).

By the way, as in the second embodiment and the like, when determining that the header information does not match the condition information, the display control portion 1606 outputs the held PTS and the header information storage portion 1608 deletes the stored information about the frame data not to be displayed from the first list (step S2609).

In this way, in the present embodiment, the decode processing portion 1603 decodes the entire frame data which arrived. The display data managing portion 1604 and the display control portion 1606 form the toggle processing portion 114, and the toggle processing portion 114 executes toggle processing to the display data storage portion 1605 referring to the header information storage portion 1608. The display data managing portion 1604 which structures part of the toggle processing portion 114 writes the decoded frame data in an enabled storage area IP, which is the same as in background art. However, during this writing, the display control portion 1606 which structures another part of the toggle processing portion 114 selects and reads only the display data to be displayed from the storage area IP with write completed according to PTS referring to the display frame condition storage portion 112 and the header information storage portion 1608, in which the present embodiment is different from background art. The read display data is stored in the display memory portion 1401, and the display portion 1607 continues to read the display data from the display memory portion 1401 at regular time intervals. Therefore, display switching of the still picture is smoothly made without a blackout. Thus, the still picture player according to the fifth embodiment continues to selectively display only the still picture that matches the set condition, that is, the required still picture (for example, still picture specified by the viewer), from among the inputted still pictures without a blackout.

Moreover, the display control portion 1606 of the present embodiment does not require the processing for managing a state of use of the display data storage portion 1605 shown in step S1001 of FIG. 10 or step S1301 of FIG. 13, advantageously reducing processing loads.

Figure 16:
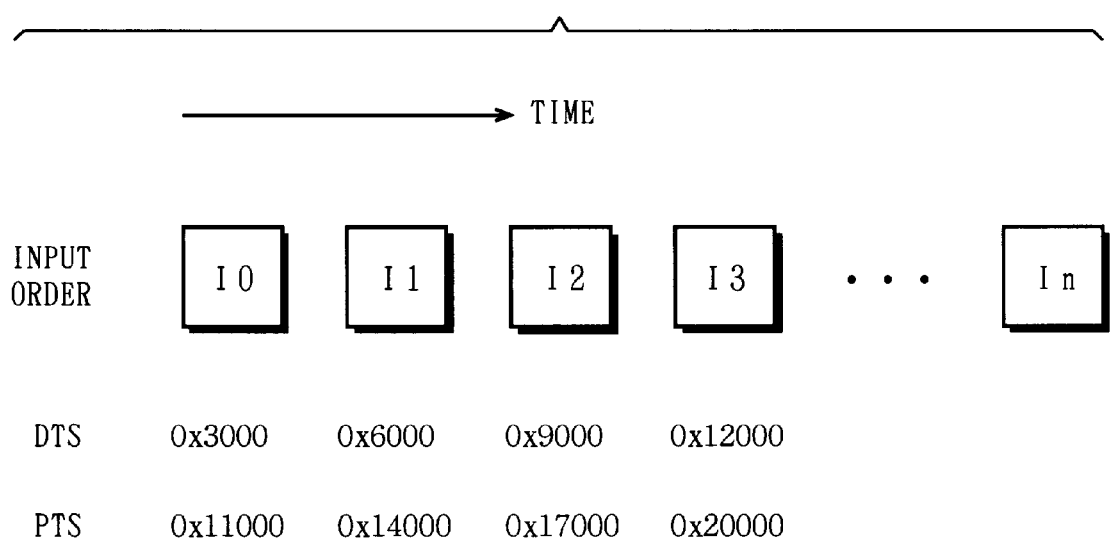
FIG. 16 shows an example of frame data as to still pictures to be inputted to a still picture player according to sixth to eighth embodiments of the present invention.

In the still picture player according to the above described third or fourth embodiment, the still picture to be received has to satisfy a prescribed condition, and, for example, it is impossible to accurately play the still pictures, each of which is formed of the frame data I0, I1, I2, I3, . . . In, respectively, as shown in FIG. 16. The way of referring to FIG. 16 is the same as that of referring to the still picture shown in FIG.1, and thus its description is omitted.

More specifically, the above described still picture player includes the storage areas IP[0] and IP[1] in the display data storage portion 1605, and I pictures are stored in these two storage areas. However, when the still picture shown in FIG. 16 is inputted to the above described still picture player, the frame data I0, I1, I2, . . . are sequentially stored in the storage area IP[0] or IP[1] according to its DTS. Now assume that the frame data I0 is the frame data to be played. Further, this frame data I0 is, as is evident from FIG. 16, decoded earliest, and is stored, for example, in the storage area IP[0]. Then, the still picture player is ready to display the frame data I0 according to PTS "0x11000". However, in the still picture player according to the third or fourth embodiment, the display control portion 1606 does not change the flag information of the storage area IP[0] in which the frame data I0 is stored to "write completed"until the display data is read, and the flag information is being set to "enabled"until this change. Therefore, the display data managing portion 1604 may write the frame data I1 or I2 decoded based on DTS "0x6000" or "0x9000" which is earlier than PTS "0x11000", of the frame data I0 in the storage area IP[0] in which the frame data I0 is stored. Therefore, at PTS "0x11000", there is a case where the display control portion 1606 cannot read the frame data I0 from the storage area IP[0] In this way, the still picture player according to the third or fourth embodiment has a problem that the display data to be played may be overwritten with the following display data. Thus, still picture players according to sixth and seventh embodiments will solve the above problem.

Described first is the still picture player according to the sixth embodiment of the present invention. In the still picture player according to the present embodiment, compared to that shown in FIG. 8, the structure of the storage area included in the display data storage portion 1605, a display data storing processing part (the display data managing portion 1604 and the display data storage portion 1605) and a still picture display part (the display control portion 1606 and the display portion 1607) are different. Other than that, the still picture player according to the sixth embodiment is the same as that of FIG. 8, and thus in the present embodiment, the same reference numerals are provided for the structures corresponding to those of FIG. 8. Described below is the still picture player according to the present embodiment, particularly, the differences from the still picture player shown in FIG. 8.

Also sequentially inputted to the present still picture player are the frame data I0, I1, . . . shown in FIG. 16. For clear description, in the present embodiment, assume that the frame data I0 is the display data to be played.

Since the display frame condition setting portion 111 and the display frame condition storage portion 112 execute the same processing procedure as that executed by the corresponding structure in FIG. 2 (refer to the above), its description is simplified. That is, the display frame condition setting portion 111 outputs, in response to specification by the viewer's side, PTS as the condition information to the display frame condition storage portion 112, and the inputted PTS as the condition information is stored in the storage area of the display frame condition storage portion 112, as shown in FIG. 3. However, at this point, the frame data as shown in FIG. 16 arrives and at least the frame data I0 is played. Therefore, stored in the storage area of the display frame condition storage portion 112 is PTS "0x11000".

After that, when the frame data receiving portion 1601 receives the frame data, the frame data receiving part, which consists of the frame data receiving portion 1601, the frame data storage portion 1602 and the header information storage portion 1608, executes the processing procedure shown in the flow chart of FIG. 25 (refer to the above). Thus, its detailed description is omitted. As described above, stored in the first list of the header information storage portion 1608 is the header information of only I pictures as shown in FIG. 5. However, at this point, since the frame data as shown in FIG. 16 is received, stored in each field of the first list is the header information according to the frame data. Further, the timing control portion 1609 executes the processing procedure shown in the flow chart of FIG. 27 (refer to the above) and therefore its detailed description is omitted. Further, the decode processing portion 1603 executes the processing procedure shown in the flow chart of FIG. 29 (refer to the above) and therefore its detailed description is omitted.

Figure 17:
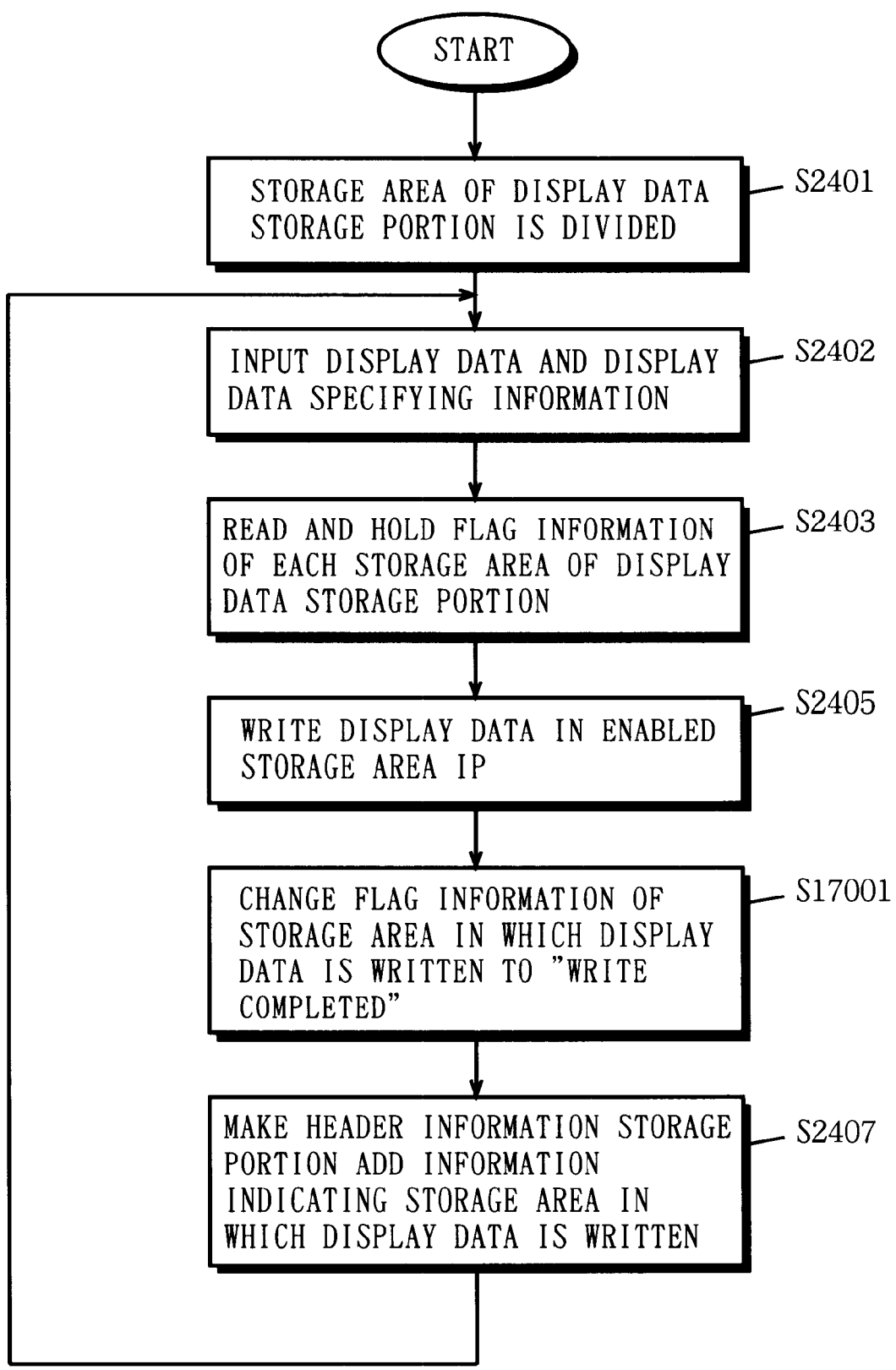
FIG. 17 is a flow chart showing a processing procedure by a display data storing processing part that consists of a display data managing portion 1604 and a display data storage portion 1605 included in the still picture player according to the sixth embodiment.

Described next is a processing procedure of the display data storing processing part (the display data managing portion 1604 and the display data storage portion 1605) referring to a flow chart shown in FIG. 17. The flow chart shown in FIG. 17 is different compared to that shown in FIG. 9 in that step S17001 is further included. Other than that, the flow chart of FIG. 17 is the same as the flow chart of FIG. 9, and thus the same step numbers are provided for the steps corresponding to those of FIG. 9 and their description is simplified. Described below is the processing procedure of the display data storing processing part.

Figure 18:
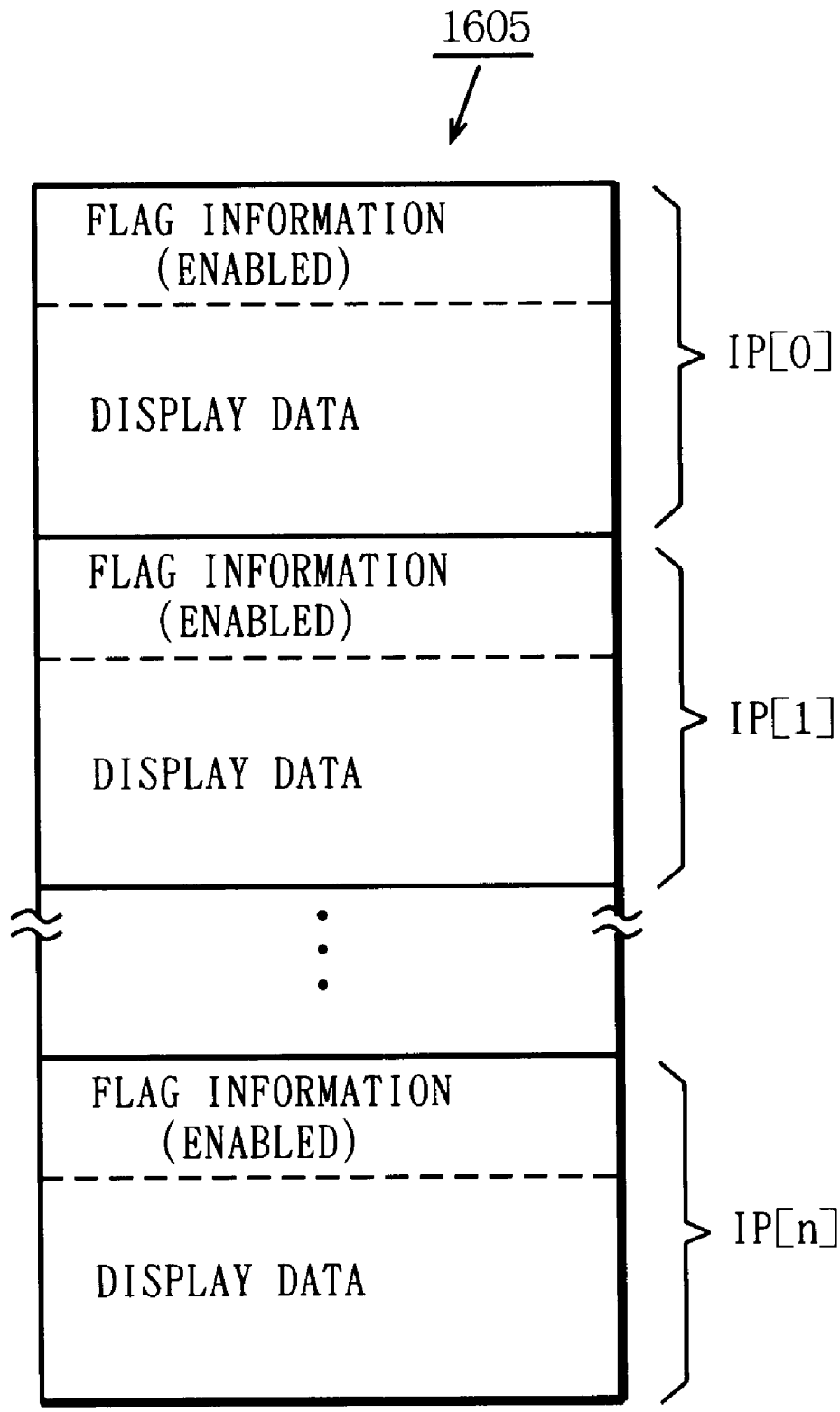
FIG. 18 is a diagram showing the more detailed structure of the display data storage portion 1605 included in the still picture player according to the sixth to eighth embodiments.

First, at the time of initialization and the like, the storage area of the display data storage portion 1605 is divided, as shown in FIG. 18, into n storage areas IP[0], IP[1], . . . IP[n] at the maximum which can store frame data I0 to In (refer to FIG. 16) (FIG. 17; step S2401). In FIG. 18, B[0] and B[1] for storing B pictures are not shown in view of simple representation. At the time of initialization, the entire flag information is set to "enabled". Next, when the display data and the display data specifying information are in putted from the decode processing portion 1603, (step S2402), the display data managing portion 1604 holds the display data and the display data specifying information. The display data managing portion 1604 then reads the presently set flag information from each storage area of the display data storage portion 1605 and holds the flag information (step S2403). The display data managing portion 1604 then writes the held display data in a display data storage area of one enabled storage area IP among all storage areas IP (step S2405).

The display data managing portion 1604 then changes the flag information of the storage area IP in which the display data is written this time to "write completed" (step S17001). The display data managing portion 1604 then requests the header information storage portion 1608 to add information indicating the storage area in which the display data is written this time in the aforesaid storage area field in the first list shown in FIG. 5 (step S2407).

Figure 19:
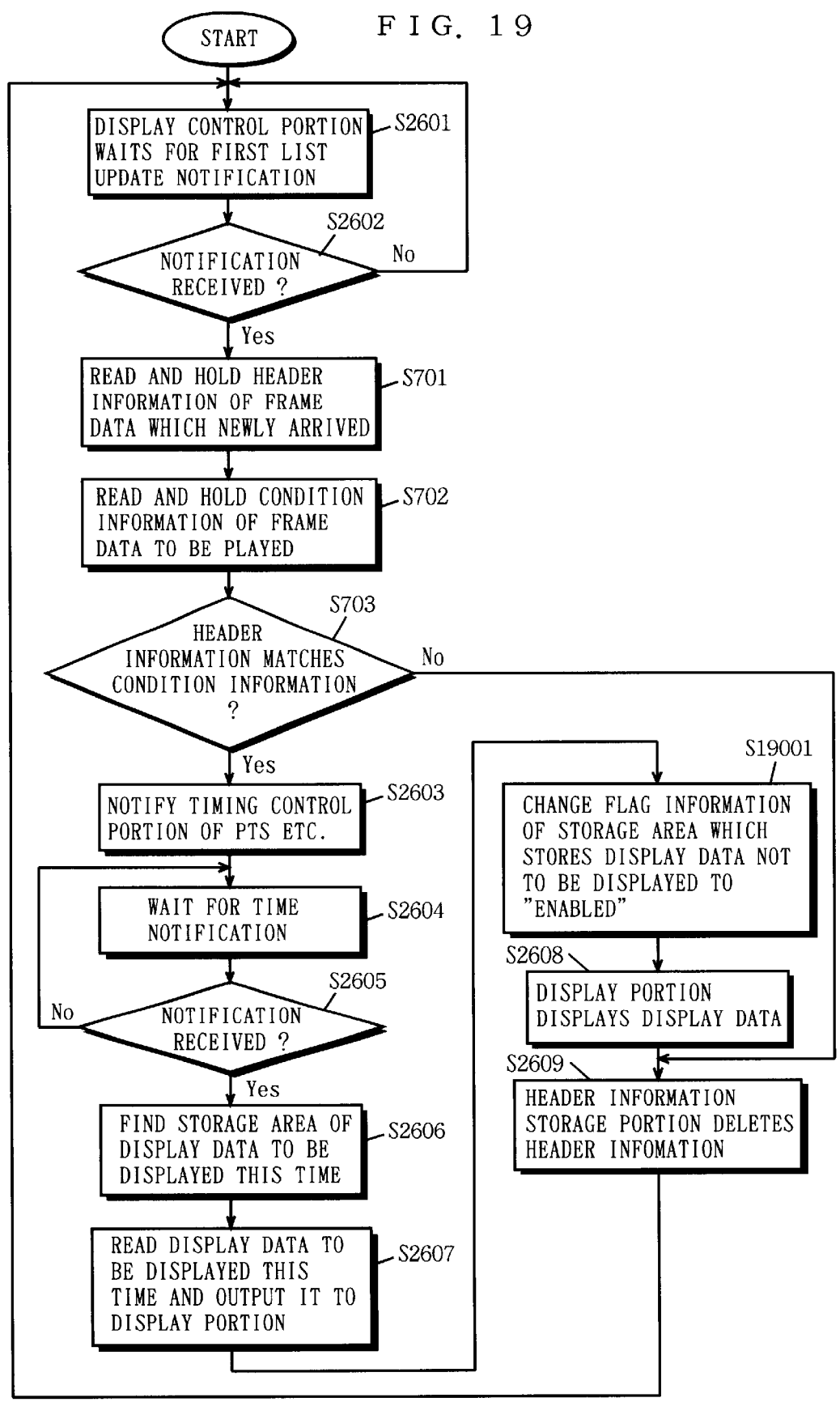
FIG. 19 is a flow chart showing a processing procedure by a still picture display part that consists of a display control portion 1606 and a display portion 1607 included in the still picture player according to the sixth embodiment.

Described next is a processing procedure of the still picture display part (the display control portion 1606 and the display portion 1607) referring to a flow chart shown in FIG. 19. The flow chart shown in FIG. 19 is different compared to that shown in FIG. 10 in that in place of step S1001, step S19001 is included. Other than that, the flow chart of FIG. 19 is the same as that of FIG. 10, and thus the same step numbers are provided for the steps corresponding to those of FIG. 10 and their description is simplified.

The display control portion 1606 executes the above described steps S2601→S2602→S701, and when notified that new frame data arrived, the display control portion 1606 reads its PTS from the first list of the header information storage portion 1608 (refer to FIG. 5) and then holds PTS (FIG. 19; step S701). Next, the display control portion 1606 reads the entire condition information (PTSes of the frame data to be played) from the storage area of the display frame condition storage portion 112 and then holds the information (step S702). Then, the display control portion 1606 determines whether or not PTS of the frame data which arrived exists in PTSes as the condition information (step S703). When determining positively, the display control portion 1606 executes the processing procedure shown in steps S2603→S2604→S2605→S2606→S2607(refer to the above). As a result, the display control portion 1606 finds the display data to be displayed this time according to its PTS, and when the present time reaches time shown by PTS, reads the corresponding display data from the storage area to output the display data to the display portion 1607.

Next, since the display control portion 1606 can find the display data not to be displayed by the above processing, the display control portion 1606 changes the flag information of the storage area IP in which the display data not to be displayed is stored to "enabled" (step S19001). Further, the display portion 1607 displays the display data read by the display control portion 1606, as described above (step S2608).

The display control portion 1606 reads the display data and then the header information storage portion 1608 deletes the stored information about the display data displayed this time (the header information and the information indicating the storage area) from the first list (step S2609).

By the way, as in the third embodiment, when determining that the header information does not match the above condition in step S703, the display control portion 1606 outputs the held PTS and the header information storage portion 1608 deletes the stored information about the frame data not to be displayed from the first list (step S2609).

In this way, also in the still picture player according to the present embodiment, like the still picture player according to the third embodiment, the display data managing portion 1604 and the display control portion 1606 form the toggle processing portion 114. The display control portion 1606 which forms part of the toggle processing portion 114 continues to access at regular time intervals another storage area in which display data matching the condition has already been written until the present time reaches PTS of the display data to be played next, and the display portion 1607 displays the display data read by this access. Thus, even when the above toggle processing is executed, display switching of the still picture is smoothly made without a blackout. Therefore, the still picture player according to the sixth embodiment continues to selectively display only the still picture that matches the set condition, that is, the required still picture (for example, still picture specified by the viewer), from among the inputted still pictures without a blackout.

By the way, the still picture player according to the present embodiment is different from the still picture player according to the third embodiment in that the display data storage portion 1605 includes n storage areas IP at the maximum, and that when writing the display data in any of the storage areas IP, the display data managing portion 1604 sets its flag information to "write completed". That is, the display data managing portion 1604 executes writing to a storage area in which the flag information "write completed" is not set every time display data is inputted. On the other hand, the display control portion 1606 changes the flag information of the storage area which stores the display data not to be displayed to "enabled". Specifically, the frame data I0, I1, . . . as shown in FIG. 16 sequentially arrive at the present still picture player, and after being decoded, are inputted to the display data managing portion 1604. Immediately after storing the display data I0 in the storage area IP[0], for example, the display data managing portion 1604 changes the flag information of the storage area IP[0] to "write completed". Further, the display data managing portion 1604 writes the following display data I1, . . . in the storage areas set as "enabled". The display data I0 stored in the storage area IP[0] may not be overwritten with the following display data I1, . . . by the time when the display data I0 is read by the display control portion 1606 based on its PTS. Thus, the above described problem can be solved, that is, required display data may not be overwritten with the following other frame data.

Described next is a still picture player according to a seventh embodiment of the present invention. In the still picture player according to the present invention, compared to the still picture player shown in FIG. 11, the structure of the storage area included in the display data storage portion 1605, a display data storage processing part (the display data managing portion 1604 and the display data storage portion 1605) and a still picture display part (the display control portion 1606 and the display portion 1607) are different. Other than that, the still picture player according to the present embodiment is the same as that of FIG. 11, and thus in the present embodiment, the same reference numerals are provided for the structures corresponding to those of FIG. 11, and described below is the still picture player according to the present embodiment, particularly, the differences from the still picture player shown in FIG. 11.

Sequentially inputted to the present still picture player are the frame data I0, I1, . . . shown in FIG. 16. For clear description, also in the present embodiment, assume that the frame data I0 is the display data to be played.

Since the display frame condition setting portion 111 and the display frame condition storage portion 112 execute the same processing procedure as that executed by the corresponding structure in FIG. 2 (refer to the above), its description is simplified. That is, the display frame condition setting portion 111 outputs, in response to specification by the viewer's side, PTS as the condition information to the display frame condition storage portion 112, and the inputted PTS as the condition information is stored in the storage area of the display frame condition storage portion 112, as shown in FIG. 3. However, at this point, the frame data as shown in FIG. 16 arrives and at least the frame data I0 is played. Therefore, stored in the storage area of the display frame condition storage portion 112 is PTS "0x11000".

After that, when the frame data receiving portion 1601 receives the frame data, the frame data receiving part, which consists of the frame data receiving portion 1601, the frame data storage portion 1602 and the header information storage portion 1608, executes the processing procedure shown in the flow chart of FIG. 25. Thus, its detailed description is omitted. As described above, stored in the first list of the header information storage portion 1608 is the header information of only I pictures as shown in FIG. 5. However, at this point, since the frame data as shown in FIG. 16 is received, stored in each field of the first list is the header information according to the frame data.

Further, the timing control portion 1609 executes the processing procedure shown in the flow chart of FIG. 27 and therefore its detailed description is omitted.

Further, the decode processing portion 1603 executes the processing procedure shown in the flow chart of FIG. 29 and therefore its detailed description is omitted.

Figure 20:
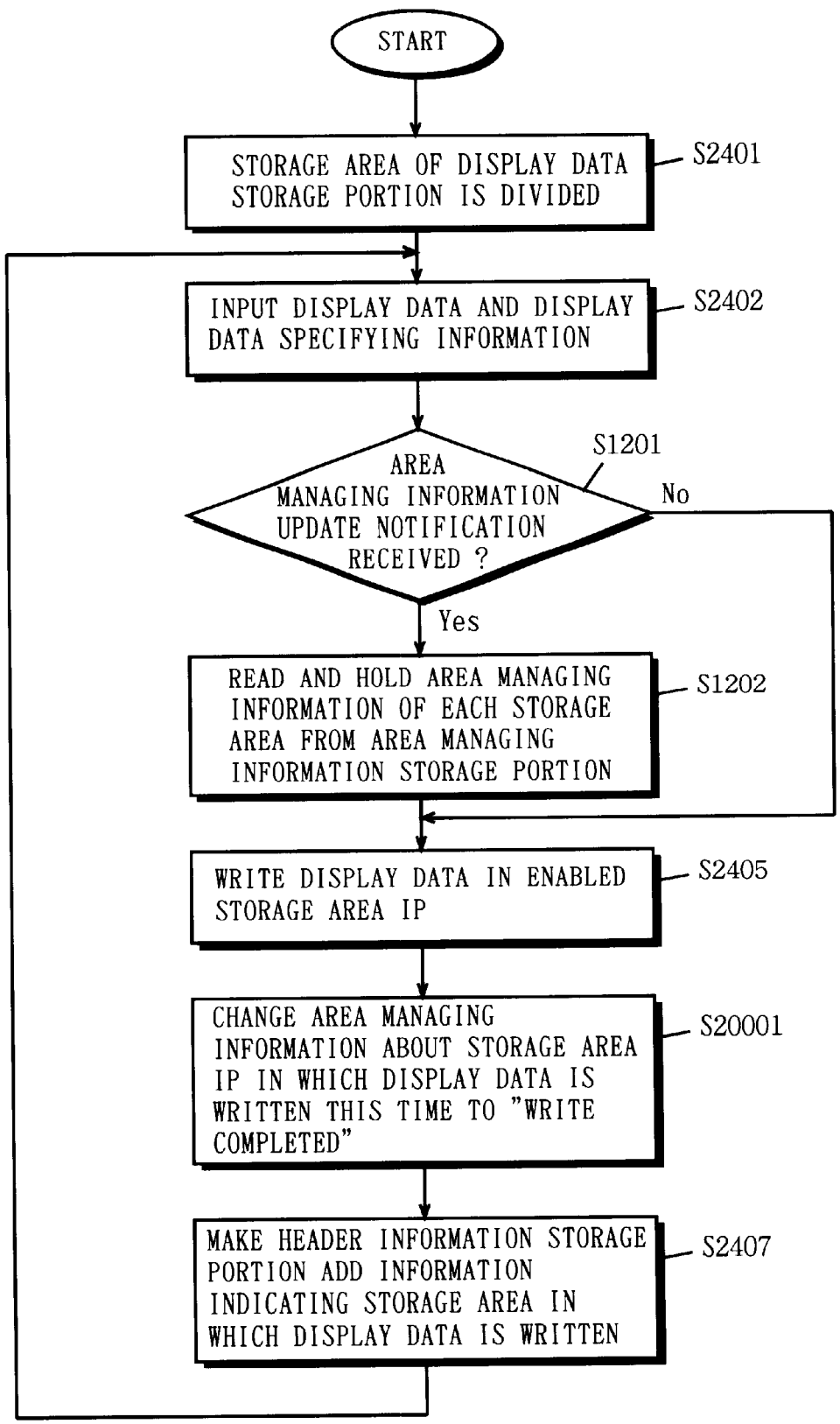
FIG. 20 is a flow chart showing a processing procedure by a display data storing processing part that consists of a display data managing portion 1604 and a display data storage portion 1605 included in the still picture player according to the seventh embodiment.

Described next is a processing procedure of the display data storing processing part (the display data managing portion 1604 and the display data storage portion 1605) referring to a flow chart shown in FIG. 20. The flow chart shown in FIG. 20 is different compared to that shown in FIG. 12 in that step S20001 is further included. Other than that, the flow chart of FIG. 20 is the same as the flow chart of FIG. 12, and thus the same step numbers are provided for the steps corresponding to those of FIG. 12 and their description is simplified. Described below is the processing procedure of the display data storing processing part.

First, at the time of initialization and the like, the storage area of the display data storage portion 1605 is divided, as shown in FIG. 18, into n storage areas IP[0], IP[1], ... IP[n] at the maximum which can store frame data I0 to In (refer to FIG. 16) (FIG. 20; step S2401). At the time of initialization, the entire flag information is set to "enabled". Next, when the display data and the display data specifying information are inputted from the decode processing portion 1603, (step S2402), the display data managing portion 1604 holds the display data and the display data specifying information.

The display data managing portion 1604 determines whether or not the area managing information update notification from the area managing information storage portion 1111 is inputted at predetermined timing (step S1201). When the update notification is inputted, the display data managing portion 1604 goes on to step S1202, and when not inputted, the display data managing portion 1604 goes on directly to step S2405.

Here, the area managing information storage portion 1111 holds a third list having fields in which the information indicating the storage area and the flag information set by the display managing portion 1604 and the display control portion 1606 are set, thereby managing the area managing information of each storage area. The area managing information storage portion 1111 outputs the area managing information update notification to the display data managing portion 1604 every time the third list is updated by the display control portion 1606 (refer to step S21001 of FIG. 21 described later).

When going on to step S1202, the display data managing portion 1604 accesses the area managing information storage portion 1111 to read the area managing information of the storage areas IP[0] to [n]) in the display data storage portion 1605 and hold the area managing information (step S1202). The display data managing portion 1604 then selects an enabled storage area IP based on the held area managing information and writes the held display data in the display data storage area of the selected storage area IP (step S2405). The display data managing portion 1604 then changes the flag information of the storage area IP in which the display data is written this time to "write completed" and then accesses the area managing information storage portion 1111 to change the area managing information about the storage area whose flag information is changed to "write completed" (step S20001). The display data managing portion 1604 then requests the header information storage portion 1608 to add information indicating the storage area in which the display data is written this time in the aforesaid storage area field in the first list shown in FIG. 5 (step S2407).

Figure 21:
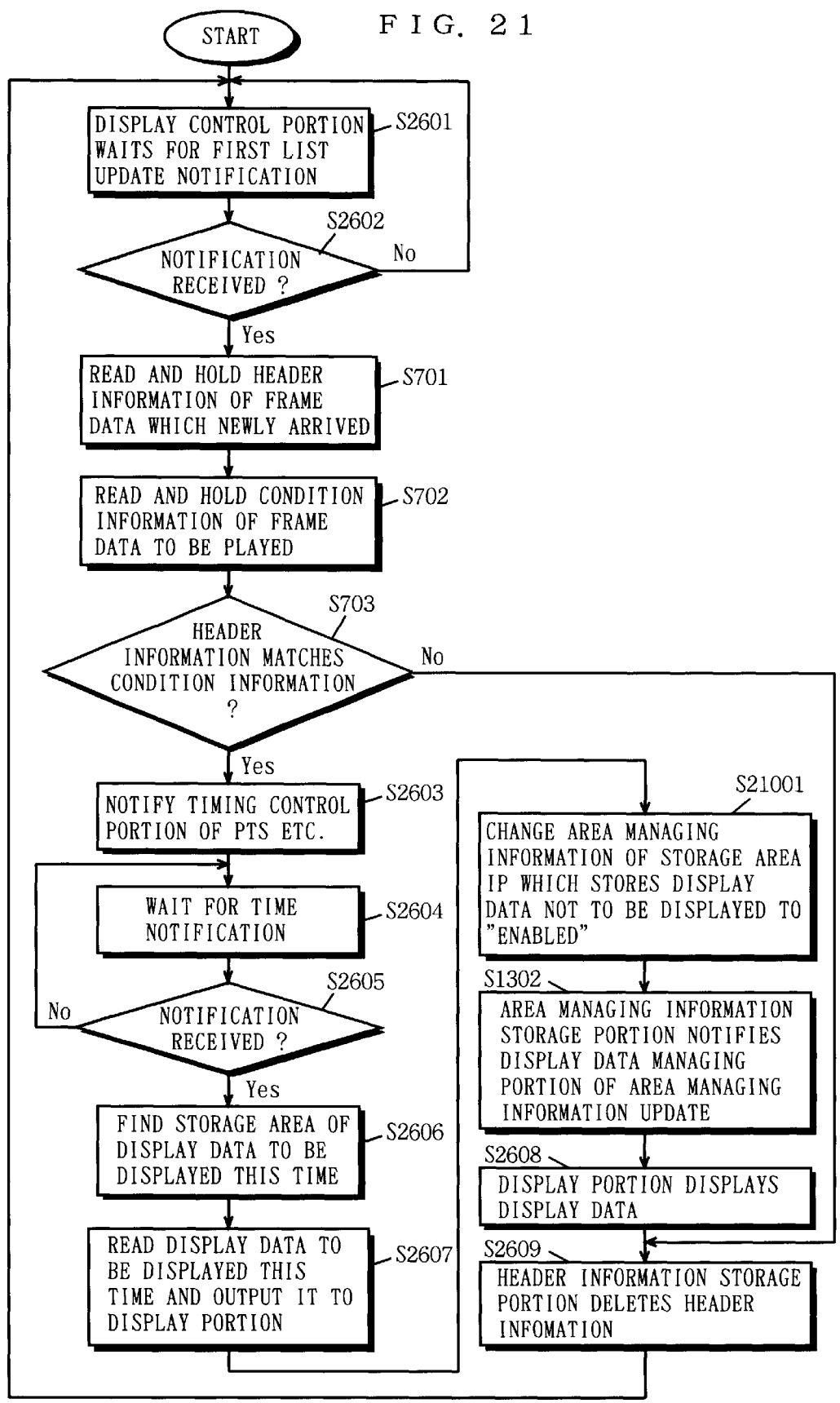
FIG. 21 is a flow chart showing a processing procedure by a still picture display part that consists of a display control portion 1606 and a display portion 1607 included in the still picture player according to the seventh embodiment.

Described next is a processing procedure of the still picture display part (the display control portion 1606 and the display portion 1607) referring to a flow chart shown in FIG. 21. The flow chart shown in FIG. 21 is different compared to that shown in FIG. 13 in that in place of step S1301, step S21001 is included. Other than that, the flow chart of FIG. 21 is the same as that of FIG. 13, and thus the same step numbers are provided for the steps corresponding to those of FIG. 13 and their description is simplified.

The display control portion 1606 executes steps S2601→S2602→S701 in FIG. 21 (refer to the above), and when notified that new frame data arrived, the display control portion 1606 reads its PTS from the first list of the header information storage portion 1608 (refer to FIG. 5) and then holds PTS (FIG. 21; step S701). Next, the display control portion 1606 reads the entire condition information (PTSes of the frame data to be played) from the storage area of the display frame condition storage portion 112 and then holds the information (step S702). Then, the display control portion 1606 determines whether or not PTS of the frame data which arrived exists in PTSes as the condition information (step S703). When determining positively, the display control portion 1606 executes the processing procedure shown in steps S2603→S2604→S2605→S2606→S2607 (refer to the above). As a result, the display control portion 1606 finds the display data to be displayed according to its PTS, and when the present time reaches time shown by PTS, reads the corresponding display data from the storage area to output the display data to the display portion 1607.

Next, since the display control portion 1606 can find the display data not be displayed by the above processing, the display control portion 1606 changes only the flag information of the storage area IP in which the display data not to be displayed is stored to "enabled", and then accesses the area managing information storage portion 1111 to change the area managing information about the storage area whose flag information is changed this time to "enabled"(step S21001). Here, the point to note is that the display control portion 1606 sets only the area managing information "enabled" and it is the display data managing portion 1604 that sets "write completed".

Then, when the third list is updated by the display control portion 1606, the area managing information storage portion 1111 outputs the above area managing information update notification to the display data managing portion 1604 (step S1302). Further, the display portion 1607 displays the display data read by the display control portion 1606, as described above (step S2608).

The display control portion 1606 reads the display data and then the header information storage portion 1608 deletes the stored information about the display data displayed this time (the header information and the information indicating the storage area) from the first list (step S2609).

By the way, as is the same in the third embodiment, when determining that the header information does not match the above condition in step S703, the display control portion 1606 outputs the held PTS and the header information storage portion 1608 deletes the stored information about the frame data not to be displayed from the first list (step S2609).

In this way, also in the still picture player according to the present embodiment, like the still picture player according to the fourth embodiment, the display data managing portion 1604 and the display control portion 1606 form the toggle processing portion 114, and the area managing information storage portion 1111 notifies the display data managing portion 1604 of timing of the toggle processing. The display control portion 1606 which forms part of the toggle processing portion 114 continues to access at regular time intervals another storage area in which display data matching the condition has already been written until the present time reaches PTS of the display data to be played next, and the display portion 1607 displays the display data read by this access. Thus, even when the above toggle processing is executed, display switching of the still picture is smoothly made without a blackout. Therefore, the still picture player according to the seventh embodiment continues to selectively display only the still picture that matches the set condition, that is, the required still picture (for example, still picture specified by the viewer), from among the inputted still pictures without a blackout.

By the way, the still picture player according to the present embodiment is different from the still picture player according to the fourth embodiment in that the display data storage portion 1605 includes n storage areas IP at the maximum, and that when writing the display data in any of the storage areas IP, the display data managing portion 1604 sets the area managing information "write completed" in the third list of the area managing information storage portion 1111. Thus, the display data managing portion 1604 executes writing to a storage area in which the area managing information "write completed" is not set in the third list every time display data is inputted. On the other hand, the display control portion 1606 changes the area managing information of the storage area which stores the display data not to be displayed to "enabled". Specifically, the frame data I0, I1, I2. . . as shown in FIG. 16 sequentially arrive at the present still picture player, and after being decoded, are inputted to the display data managing portion 1604. Immediately after storing the display data I0 in an enabled storage area (for example, IP[0]), the display data managing portion 1604 changes the area managing information of the storage area IP[0] to "write completed". Further, the display data managing portion 1604 writes the following display data I1, . . . in the storage areas set as "enabled"based on the area managing information change notification. In this way, the display data I0 stored in the storage area IP[0] may not be overwritten with the following display data I1, . . . by the time when the display data I0 is read by the display control portion 1606 based on its PTS. Thus, the above described problem can be solved, that is, required display data may not be overwritten with the following other frame data.

In each of the above described embodiments, assuming that the still picture has a format based on standards of ISO/IEC13818-1 and -2, the still picture player uses PTS as the condition of the required still picture. However, each field of PES Header such as stream_id, DTS and the like may be used as the condition of the required still picture. Further, a plurality of fields of PES Header and the header information of the above described elementary_stream may also be used as the condition of the required still picture.

Further, in each of the above described embodiments, the inputted frame data of the still picture is assumed to have a format based on standards of ISO/IEC13818-1 and -2, as shown in FIG. 23. However, the format is not restricted to the above standards of ISO/IEC1388118-1 and -2, and the still picture may have any type of format if only the still picture has information capable of specifying each piece of frame data therein.

Further, the still picture player is used for expanding a video playing function of a video player. That is, the video player to which the present still picture player is added can have not only a video playing function but also a still picture playing function. Here, switching of playing functions of video or still picture can be easily made based on a channel set by the viewer's side (that is, based on whether the set channel is providing video or still picture), for example. Therefore, in the above embodiments, the video playing function is not particularly described and only the playing function of the still picture is described.

Further, in the still picture player according to each of the above described embodiments, compared to the above described conventional video player, as is evident from the drawings and description, a considerable number of parts with common structures and processing procedures exist. Therefore, the present still picture player includes parts which can be shared with the conventional video player, and it is thus possible to prevent increases in cost and size at the minimum even if the present still picture player is added to the video player.

While the invention has been described in detail, the foregoing description is in all aspects illustrative and not restrictive. It is understood that numerous other modifications and variations can be devised without departing from the scope of the invention.

What is claimed is:

1. A still picture player for expanding a video playing function of a video player to provide a still picture playing function for the video player, said still picture player being for use with inputted still pictures, said still picture player comprising:

a condition storage portion for storing a condition for specifying a still picture to be played;

a decode processing portion for decoding the inputted still pictures;

a display data storage portion including two areas for storing two pieces of display data which constitute a still picture decoded by said decode processing portion;

a toggle processing portion for:
assigning one of said two areas as a first area for writing the display data and the other of said two areas as a second area for reading display data which has been already written in said second area,
determining whether the display data written in said first area matches the condition stored in said condition storage portion,
continuously reading from said second area when the display data written in said first area does not match the condition stored in said condition storage portion, and
when the display data written in the first area matches the condition stored in said condition storage portion, changing assignment of said two areas such that said one of said two areas is assigned as said second area and said other of said two areas is assigned as said first area; and a display portion for displaying the display data read by said toggle processing portion.

2. The still picture player according to claim 1 wherein said two areas further each have a flag information storage area for storing first or second flag information indicating assignment as said first or second area; and said toggle processing portion executes assignment of said first and second areas and a change in assignment of said first and second areas using said first and second flag information.

3. The still picture player according to claim 2, wherein the inputted still pictures include header information according to a prescribed encoding method; and the condition for specifying a still picture is based on the header information.

4. The still picture player according to claim 2, wherein the inputted still pictures include a hierarchical structure having unique header information of each layer; and the condition for specifying a still picture is based on the header information.

5. The still picture player according to claim 1, wherein
said toggle processing portion further includes an area managing information storage portion for managing first or second area managing information indicating that said two areas are assigned as said first or second area; and
said toggle processing portion executes assignment of said first and second areas and a change in assignment of said first and second areas referring to said area managing information storage portion.

6. The still picture player according to claim 5, wherein
the inputted still pictures include header information according to a prescribed encoding method; and
the condition for specifying a still picture is based on the header information.

7. The still picture player according to claim 5, wherein
the inputted still pictures include hierarchical structure having unique header information of each layer; and
the condition for specifying a still picture is based on the header information.

8. The still picture player according to claim 1, wherein
the inputted still pictures include header information according to a prescribed encoding method; and
the condition for specifying a still picture is based on the header information.

9. The still picture player according to claim 1, wherein
the inputted still pictures include a hierarchical structure having unique header information of each layer; and
the condition for specifying a still picture is based on the header information.

10. A still picture player for expanding a video playing function of a video player to provide a still picture playing function for the video player, said still picture player being for use with inputted still pictures, said still picture player comprising:
a condition storage portion for storing a condition for specifying a still picture to be played;
a decode processing portion for decoding the inputted still pictures;
a display data storage portion including two areas for storing two pieces of display data which constitute a still picture decoded by said decode processing portion;
a toggle processing portion for:
assigning one of said two areas as a first area for writing the display data and the other of said two areas as a second area for reading display data which has been already written in said second area,
determining whether the display data written in said first area matches the condition stored in said condition storage portion,
waiting for writing of new display data in said first area when the display data written in said first area does not match the condition stored in said condition storage portion,
after reading from said first area when the display data written in said first area matches the condition stored in said condition storage portion, changing assignment of said two areas such that said one of said two areas is assigned as said second area and said other of said two areas is assigned as said first area, and
continuously reading display data from said second area until the changing of assignment of said two areas;
a display memory portion for storing the display data read by said toggle processing portion; and
a display portion for reading the display data from said display memory portion and displaying the display data.

11. The still picture player according to claim 10, wherein
the inputted still pictures include header information according to a prescribed encoding method; and
the condition for specifying a still picture is based on the header information.

12. The still picture player according to claim 10, wherein
the inputted still pictures include a hierarchical structure having unique header information of each layer; and
the condition for specifying a still picture is based on the header information.

13. A still picture player for expanding a video playing function of a video player to provide a still picture playing function for the video player, said still picture player being for use with inputted still pictures, said still picture player comprising:
a condition storage portion for storing a condition for specifying a still picture to be played;
a decode processing portion for decoding the inputted still pictures;
a display data storage portion including areas, whose number is at the maximum the number of pieces of a still picture which can be stored by said areas, for storing display data which constitutes a still picture decoded by said decode processing portion in said areas;
a toggle processing portion for assigning any area among said areas as a first area for writing the display data and any area except the area assigned as said first area as a second area for reading display data which has been already written in said second area, changing assignment of said areas of said display data storage portion as said first and second areas when the display data written in said first area matches the condition stored in said condition storage portion and continuing to read from said second area when otherwise; and
a display portion for displaying the display data read by said toggle processing portion.

14. The still picture player according to claim 13, wherein
said areas further each have a flag information storage area for storing first or second flag information indicating assignment as said first or second area; and
said toggle processing portion executes assignment of said first and second areas and a change in assignment of said first and second areas using said first and second flag information.

15. The still picture player according to claim 14, wherein
the inputted still pictures include header information according to a prescribed encoding method; and
the condition for specifying a still picture is based on the header information.

16. The still picture player according to claim 14, wherein
the inputted still pictures include a hierarchical structure having unique header information of each layer; and
the condition for specifying a still picture is based on the header information.

17. The still picture player according to claim 13, wherein
said toggle processing portion further includes an area managing information storage portion for managing first or second area managing information indicating that said areas are assigned as said first or second area; and said toggle processing portion executes assignment of said first and second areas and a change in assignment of said first and second areas referring to said area managing information storage portion.

18. The still picture player according to claim 17, wherein the inputted still pictures include header information according to a prescribed encoding method; and the condition for specifying a still picture is based on the header information.

19. The still picture player according to claim 17, wherein the inputted still pictures include a hierarchical structure having unique header information of each layer; and the condition for specifying a still picture is based on the header information.

20. The still picture player according to claim 13, wherein the inputted still pictures include header information according to a prescribed encoding method; and the condition for specifying a still picture is based on the header information.

21. The still picture player according to claim 13, wherein the inputted still pictures include a hierarchical structure having unique header information of each layer; and the condition for specifying a still picture is based on the header information.

22. A still picture player for expanding a video playing function of a video player to provide a still picture playing function for the video player, said still picture player being for use by a viewer-person and being for use with a cyclically-inputted sequence of still pictures, the still pictures being respectively represented in frames, and each respective frame is provided with a time-stamp;

said still picture player comprising:
   a condition storage portion for storing condition information that specifies the time-stamp of a frame selected by the viewer-person to be played;
   a frame selecting portion for selecting the frame to be played from among the inputted still pictures according to the condition information stored in said condition storage portion;
   a decode processing portion for decoding the frame selected by said frame selecting portion;
   a display data storage portion having a plurality of storage areas each capable of storing the frame decoded by said decode processing portion;
   a toggle processing portion for executing toggle processing, which comprises writing, as selected display data, the frame decoded by said decode processing portion in an enabled storage area of said plurality of storage areas in said display data storage portion and continuously reading previously-stored display data from another of said storage areas other than said enabled storage area until the selected display data is written in said enabled area; and
   a display portion for displaying the selected display data read by said toggle processing portion.

23. The still picture player according to claim 22, wherein the time stamps define display timings, and said toggle processing portion continuously reads, based on the time stamp of the selected display data, the previously stored display data from the another of said storage areas until the selected display data is written in said enabled storage area and the display timing of the selected display data in said enabled storage area comes.

24. The still picture player according to claim 22, wherein the still picture is provided with header information according to a prescribed encoding method, and the condition for specifying the frame to be played is based on the header information.

25. The still picture player according to claim 22, wherein the still picture has a hierarchical data structure having unique header information of each layer, and the condition for specifying the frame to be played is based on the header information.

26. A still picture player for expanding a video playing function of a video player to provide a still picture playing function for the video player, said still picture player being for use by a viewer-person and being for use with a cyclically-inputted sequence of still pictures, the still pictures being respectively represented in frames, and each respective frame is provided with a time-stamp;

said still picture player comprising:
   a condition storage portion for storing condition information that specifies the time-stamp of a frame selected by the viewer-person to be played;
   a decode processing portion for decoding only the frame to be played from among the inputted still pictures according to the condition information stored in said condition storage portion;
   a display data storage portion having a plurality of storage areas each capable of storing the frame decoded by said decode processing portion;
   a toggle processing portion for executing toggle processing, which comprises writing, as selected display data, the frame decoded by said decode processing portion in an enabled storage area of said plurality of storage areas in said display data storage portion and continuously reading previously-stored display data from another of said storage areas other than said enabled storage area until the selected display data is written in said enabled area; and
   a display portion for displaying the selected display data read by said toggle processing portion.

27. The still picture player according to claim 26, wherein the time stamps define display timings, and said toggle processing portion continuously reads, based on the time stamp of the selected display data, the previously-stored display data from the another of said storage areas until the selected display data is written in said enabled storage area and the display timing of the selected display data in said enabled storage area comes.

28. The still picture player according to claim 26, wherein the still picture is provided with header information according to a prescribed encoding method, and the condition for specifying the frame to be played is based on the header information.

29. The still picture player according to claim 26, wherein the still picture has a hierarchical data structure having unique header information of each layer, and the condition for specifying the frame to be played is based on the header information.

* * * * *